(12) United States Patent
Fang et al.

(10) Patent No.: US 12,069,621 B2
(45) Date of Patent: Aug. 20, 2024

(54) RESOURCE INDICATION METHOD, RESOURCE INDICATION APPARATUS, DATA RECEIVING METHOD, AND DATA RECEIVING APPARATUS

(71) Applicant: ZTE Corporation, Shenzhen (CN)

(72) Inventors: Huiying Fang, Shenzhen (CN); Bo Dai, Shenzhen (CN); Weiwei Yang, Shenzhen (CN); Kun Liu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 249 days.

(21) Appl. No.: 17/592,941

(22) Filed: Feb. 4, 2022

(65) Prior Publication Data

US 2022/0240233 A1 Jul. 28, 2022

Related U.S. Application Data

(63) Continuation of application No. PCT/CN2020/107637, filed on Aug. 7, 2020.

(30) Foreign Application Priority Data

Aug. 7, 2019 (CN) .......................... 201910733945.7

(51) Int. Cl.
*H04W 4/70* (2018.01)
*H04L 5/00* (2006.01)
(Continued)

(52) U.S. Cl.
CPC ......... *H04W 72/044* (2013.01); *H04W 28/26* (2013.01)

(58) Field of Classification Search
CPC ..... H04W 72/044; H04W 28/26; H04W 4/70; H04L 5/004; H04L 5/0044
See application file for complete search history.

(56) References Cited

U.S. PATENT DOCUMENTS 10,715,951 B1 * 7/2020 Ratasuk .................... G01S 5/08
2015/0031384 A1 * 1/2015 Jiang ..................... H04L 5/0032
455/452.1

(Continued)

FOREIGN PATENT DOCUMENTS

CN   108605364 A   9/2018
CN   109803402     5/2019
(Continued)

OTHER PUBLICATIONS

3GPP TSG ARN WG1 Meeting#78bits, R1-143849 Title: Triggering sonditions for D2D ss transmission by in-coverage Ues (Year: 2014).*

(Continued)

*Primary Examiner* — Faruk Hamza
*Assistant Examiner* — Abusayeed M Haque
(74) *Attorney, Agent, or Firm* — Crowell & Moring LLP

(57) ABSTRACT

Provided are a resource indication method, a resource indication apparatus, a data receiving method and a data receiving apparatus. The resource indication method includes transmitting first indication signaling to a terminal; where the first indication signaling includes reserved time domain resource information used for indicating that reserved time domain resource are not allowed to be used for transmission.

15 Claims, 6 Drawing Sheets

(51) Int. Cl.
  *H04W 28/26* (2009.01)
  *H04W 72/044* (2023.01)

(56) References Cited

U.S. PATENT DOCUMENTS

| | | | | |
|---|---|---|---|---|
| 2018/0098322 | A1* | 4/2018 | Yoon | H04W 72/23 |
| 2018/0367269 | A1* | 12/2018 | Ly | H04L 5/0048 |
| 2019/0053202 | A1 | 2/2019 | Bendlin et al. | |
| 2019/0245663 | A1* | 8/2019 | Kim | H04L 5/0048 |
| 2020/0162228 | A1* | 5/2020 | Gao | H04L 5/0051 |
| 2020/0170052 | A1* | 5/2020 | Yang | H04W 28/26 |
| 2021/0314919 | A1* | 10/2021 | Kwak | H04W 72/02 |
| 2022/0263615 | A1* | 8/2022 | Viering | H04L 5/0032 |

FOREIGN PATENT DOCUMENTS

| | | | | |
|---|---|---|---|---|
| CN | 111092706 A | 5/2020 | | |
| WO | WO-2014007573 A1 * | 1/2014 | | H04J 11/0069 |
| WO | WO 2018/203650 | 11/2018 | | |
| WO | WO-2018228232 A1 * | 12/2018 | | H04J 11/0079 |
| WO | WO 2019/064228 A2 | 4/2019 | | |
| WO | WO 2019/134086 | 7/2019 | | |
| WO | WO-2019143937 A1 * | 7/2019 | | |
| WO | WO 2021/023288 | 2/2021 | | |

OTHER PUBLICATIONS

3GPP TSG ARN WG1 Meeting#87, R1-1612099 Title: Remaining issues of VoLTE/ViLTE coverage enhancement (Year: 2016).*
3GPP TSG ARN WG1 Meeting#92bis R1-1803998 Title: Power Offset between SS/PBCH block and PDCCH (Year: 2018).*
Indian Office Action issued Jan. 30, 2023 in corresponding Indian Patent Application No. 202217012076.
Australian Examination Report issued Mar. 17, 2023 in corresponding Australian Patent Application No. 2020324253.
Japanese Notice of Allowance issued Aug. 17, 2023 in corresponding Japanese Patent Application No. 2022-507403 with English translation.
Japanese Office Action issued Apr. 4, 2023 in corresponding Japanese Patent Application No. 2022-507043 with English translation.
Extended European Search Report issued Aug. 30, 2023 in corresponding European Patent Application No. 20849647.1.
Chinese Notification of the Second Office Action issued Mar. 14, 2023 in corresponding Chinese Patent Application No. 201910733945.7 with English translation.
Chinese Notification of the First Office Action issued Dec. 6, 2022 in corresponding Chinese Patent Application No. 201910733945.7 with English translation.
Ericsson, Coexistence of NB-IoT with NR [online], 3GPP TSG RAN WG1 #97 R1-1905968, Internet<URL:https://www.3gpp.org/ftp/tsg_ran/WG1_RL1/TSGR1_97/Docs/R1-1905968.zip>, May 4, 2019.
Ericsson, Analysis of requirements for RRC connection release with redirection from LTE to NR [online], 3GPP TSG RAN WG4 #90 R4-1901618, Internet<URL:https://www.3gpp.org/ftp/tsg_ran/WG4_Radio/TSGR4_90/Docs/R4-1901618.zip>, Feb. 15, 2019.
Huawei, HiSilicon, On eMTC co-existence with NR [online], 3GPP TSG RAN WG1 #94 R1-1808122, Internet<URL:http://www.3gpp.org/ftp/tsg_ran/WG1_RL1/TSGR1_94/Docs/R1-1808122.zip>, Aug. 11, 2018.
ZTE, Coexistence of NB-IoT with NR [online], 3GPP TSG RAN WG1 #98 R1-1908267, Internet<URL:https://www.3gpp.org/ftp/tsg_ran/WG1_RL1/TSGR1_98/Docs/R1-1908267.zip>, Aug. 17, 2019.
ZTE, Coexistence of LTE-MTC with NR [online], 3GPP TSG RAN WG1 #98b R1-1910265, Internet<URL:https://www.3gpp.org/ftp/tsg_ran/WG1_RL1/TSGR1_98b/Docs/R1-1910265.zip>, Oct. 5, 2019.
Huawei et al: "Feature Lead Summary of Coexistence of NB-IoT with NR", 3GPP Draft; R1-1907574, 3rd Generation Partnership Project (3GPP), Mobile Competence Centre; 650, Route Des Lucioles; F-06921 Sophia-Antipolis Cedex; France, vol. RAN WG1, No. Reno, USA; May 13, 2019-May 17, 2019 May 16, 2019 (May 16, 2019), XP051739878, Retrieved from the Internet:URL:http://www.3gpp.org/ftp/tsg%5Fran/WG1%5FRL1/TSGR1%5F97/Docs/RI%2DI907574%2Ezip [retrieved on May 16, 2019] * Sect.s 2, 2.1 *.
Ericsson: "Coexistence of NB-IoT with NR", 3GPP Draft; R1-1909998 Coexistence of NB-IoT With NR, 3rd Generation Partnership Project (3GPP), Mobile Competence Centre; 650, Route Des Lucioles; F-06921 Sophia-Antipolis Cedex; France, vol. RAN WG1, No. Chongqing, CN; Oct. 14, 2019-Oct. 20, 2019 Oct. 5, 2019 (Oct. 5, 2019), XP051788805, Retrieved from the Internet: URL:http:/www.3gpp.org/ftp/tsg_ran/WG1_RL_1/TSGR1_98b/Docs/R1-1909998.zip [retrieved on Oct. 5, 2019] * Sect. 2 *.
ZTE. "Coexistence of NB-IoT with NR." 3GPP TSG RAN WGJ Meeting #98bis, RI-1910274, Oct. 20, 2019 (Oct. 20, 2019), sections 2.1-2.2 (5 pages).
ZTE,. "Resource reservation for coexistence of NB-IoT with NR" 3GPP TSG RAN WGJ Meeting #99, RI-1912419, Nov. 22, 2019 (Nov. 22, 2019), sections 2.1-2.2 (5 pages).
ZTE,. "Coexistence of NB-IoT with NR," 3GPP TSG RAN WGJ Meeting #96bis, RI-1904354, Apr. 12, 2019 (Apr. 12, 2019), sections 2.1-2.3 (4 pages).
ZTE. "Discussion on coexistence ofNB-IoT with NR." 3GPP TSG RAN WGJ Meeting #94, RI-1808643, Aug. 24, 2018 (Aug. 24, 2018), section 2.2 (3 pages).
International Search Report and Written Opinion for Application No. PCT/CN2020/107637 and translation of International Search Report mailed Nov. 3, 2020 (11 pages).
Search Report and Written Opinion for Singapore Application No. 11202201134S mailed May 15. 2024 (11 pages).
ZTE, "Coexistence of LTE-MTC with NR", 3GPP TSG RAN WG1 Meeting #97, R1-1906498, May 4, 2019.
ZTE, "Coexistence of NB-IoT with NR", 3GPP TSG RAN WG1 Meeting #97, R1-196508, May 4, 2019.

* cited by examiner

RESOURCE INDICATION METHOD, RESOURCE INDICATION APPARATUS, DATA RECEIVING METHOD, AND DATA RECEIVING APPARATUS

This application is a continuation of International Patent Application No. PCT/CN2020/107637, filed Aug. 7, 2020, which claims priority to Chinese Patent Application No. 201910733945.7 filed with the China National Intellectual Property Administration (CNIPA) on Aug. 7, 2019. The contents of International Patent Application No. PCT/CN2020/107637 and Chinese Patent Application No. 201910733945.7 are incorporated by reference in their entirety.

I. TECHNICAL FIELD

The present application relates to the field of communications, for example, a resource indication method, a resource indication apparatus, a data receiving method and a data receiving apparatus.

II. BACKGROUND

Machine-type communication (MTC) is also referred to as machine-to-machine (M2M). MTC and Narrow Band Internet of Things (NB-IoT) are main application forms of the Internet of Things. In the related art, an MTC terminal based on Long-Term Evolution/Long Term Evolution Advanced (LTE/LTE-A) is generally deployed under a same system bandwidth as a legacy LTE/LTE-A terminal. An NB-IoT terminal uses inband and guard band deployment methods and is also deployed in the same system bandwidth as the legacy LTE/LTE-A terminal. As the legacy LTE/LTE-A terminal withdraws from the market, an LTE spectrum in the related art will be replaced by the 5th generation mobile networks (5G) New Radio (NR).

In the case of a limited coexistence system bandwidth, LTE-MTC/NB-IoT and NR systems cannot each enjoy independent frequency domain regions within the coexistence system bandwidth. In this case, the LTE-MTC/NB-IoT and NR systems will share the same frequency domain resources. Since the MTC terminal and the NB-IoT terminal based on the LTE/LTE-A have a service life of at least ten years, a long time of coexistence of an MTC system based on the LTE/LTE-A (an LTE-MTC system for short) or an NB-IoT system and an NR system is required. How to ensure the performance of a coexistence system in the case of the limited coexistence system bandwidth is a problem that needs to be solved.

III. SUMMARY

Embodiments of the present application provide solutions described below.

Embodiments of the present application provide a resource indication method, which includes:
transmitting first indication signaling to a terminal;
wherein the first indication signaling includes reserved time domain resource information used for indicating that first time domain resource is not allowed to be used for transmission.

In an implementation, the first indication signaling includes time domain reservation period information and time domain offset information, and time domain resource information reserved in a time domain reservation period corresponding to the time domain reservation period information.

In an implementation, time domain resource reserved in the time domain reservation period is represented by a time domain reservation bitmap; and a time domain offset corresponding to the time domain offset information is a distance between a subframe where a starting position of the time domain reservation bitmap in the time domain reservation period is located and a start of the time domain reservation period.

In an implementation, the time domain reservation period information and the time domain offset information are jointly coded or independently coded.

In an implementation, the time domain reservation period information and the time domain offset information are jointly indicated through 6 bits.

In an implementation, the time domain reservation period information and the time domain offset information are respectively indicated; where the time domain reservation period information is indicated through 3 bits; and the time domain offset information is indicated through 5 bits.

In an implementation, the time domain reservation bitmap includes a slot reservation bitmap used for indicating a reserved slot in the time domain reservation period.

In an implementation, in a case where a bit corresponding to the slot reservation bitmap is set to a first value, a symbol actually reserved in a slot is determined according to a parity of a slot index.

In an implementation, a length of the slot reservation bitmap is 4 bits or 10 bits In an implementation, the time domain reservation bitmap includes a reservation symbol bitmap used for indicating a reserved symbol in the time domain reservation period.

In an implementation, the time domain reservation bitmap includes a subframe reservation bitmap used for indicating a reserved symbol in the time domain reservation period.

In a case where a bit corresponding to the subframe reservation bitmap is a first value, a symbol bit preset in a corresponding subframe is indicated to be reserved.

In an implementation, the time domain reservation bitmap includes a subframe reservation bitmap and a reservation symbol bitmap which are used for indicating a reserved symbol in the time domain reservation period.

In an implementation, in a case where a bit corresponding to the subframe reservation bitmap is set to a first value, the reservation symbol bitmap is used for indicating a reserved symbol in a corresponding subframe in the time domain reservation period.

In an implementation, a length of the subframe reservation bitmap is 2 bits, 5 bits, or 10 bits.

In an implementation, a length of the reservation symbol bitmap is 2 bits, 7 bits, 14 bits, 28 bits, 70 bits, 7-$L_{start}$ bits, or 14-$L_{start}$ bits; and $L_{start}$ denotes a length of a long-term evolution (LTE) downlink control region.

In an implementation, the first value is 1 or 0.

In an implementation, the time domain resource information reserved in the time domain reservation period includes slot reservation bitmap information and subframe reservation bitmap information.

In a case where a bit corresponding to a subframe reservation bitmap is a first value, a reserved symbol in a corresponding subframe in the time domain reservation period is predefined.

Alternatively, the time domain resource information reserved in the time domain reservation period includes slot reservation bitmap information, subframe reservation bitmap information, and reservation symbol bitmap information; where a reserved symbol in a corresponding subframe in the time domain reservation period is determined according to the reservation symbol bitmap information.

In an implementation, a reserved subframe starts from X subframes after an end position of the reserved slot, where X is an integer.

In an implementation, a length of the subframe reservation bitmap is 3 bits, 5 bits, 6 bits, 8 bits, or 10 bits.

In an implementation, the first indication signaling includes time domain reservation period information used for indicating a time domain reservation period.

First Y symbols in the time domain reservation period are reserved symbols configured for target data, and a value of Y is indicated by reservation symbol information in the time domain reservation period, or a value of Y is predefined.

In an implementation, in a case where the time domain reservation period is one subframe, first fourth value symbols of the subframe are reserved, where the fourth value is less than or equal to $L_{start}$.

$L_{start}$ denotes a maximum length of an LTE downlink control region.

In one embodiment, reserved time domain resource indication information includes slot reservation bitmap information and reservation symbol bitmap information.

A time domain reservation period of a slot reservation bitmap is predefined or configured through signaling; and a time domain reservation period of a reservation symbol bitmap is predefined or configured through signaling.

The time domain reservation period of the slot reservation bitmap is the same as or different from the time domain reservation period of the reservation symbol bitmap.

In an implementation, the first indication signaling further includes reserved frequency domain resource information.

The reserved frequency domain resource information is used for indicating that frequency domain resource corresponding to reserved time domain resource is not allowed to be used for transmission.

In an implementation, the method includes:
transmitting Second indication signaling; where the second indication signaling indicates that frequency domain resource corresponding to reserved time domain resource is not allowed to be used for transmission.

In an implementation, reserved frequency domain resource includes at least one consecutive resource block, or at least one consecutive narrowband, or at least one consecutive resource block group.

In an implementation, in a case where a number of resource blocks included in a system does not exceed a maximum number of resource blocks that need to be reserved, the following is satisfied:
in a case where $RB_{START}=0$, FFRIV=$L_{CRRB}-1$.
in a case where $0<RB_{START}<N$, FFRIV=N+$RB_{START}-1$.
for $0<=FRRIV<N$, reserved resource blocks are (FRRIV+1) consecutive resource blocks from resource block 0 to resource block FRRIV; where $RB_{START}=0$ and $L_{CRRB}$=FRRIV+1;
for $N<=FRRIV<2N-1$, indexes of the reserved resource blocks are from (FRRIV-N+1) to (N-1); where LCRRB=2N-FRRIV-1;
where N denotes the number of the resource blocks included in the system; FRRIV denotes a frequency domain reservation indication value; $RB_{START}$ is used for indicating a starting position of a reserved resource block; and $L_{CRRB}$ is used for indicating a number of the reserved resource blocks.

In an implementation, in a case where a number of resource blocks included in a system exceeds a maximum number of resource blocks that need to be reserved, the following is satisfied:
in a case where RBSTART=0, FFRIV=LCRRB−1;
in a case where RBSTART>0, FFRIV=RBSTART+M−1;
for $0<=FRRIV<N$, reserved resource blocks are (FRRIV+1) consecutive resource blocks from resource block 0 to resource block FRRIV; where RBSTART=0, and LCRRB=FRRIV+1;
for $M<=FRRIV<N$, the reserved resource blocks are M consecutive resource blocks starting from resource block (FRRIV−M+1); where RBSTART=FRRIV−M+1, and LCRRB=M; and
for $N<=FRRIV<N+M-1$, the reserved resource blocks are consecutive resource blocks from resource block (FRRIV−M+1) to resource block (N−1); where RBSTART=(FRRIV−M+1), and LCRRB=N+M−FRRIV−1;
where N denotes the number of the resource blocks included in the system; M denotes the maximum value of the number of the resource blocks that need to be reserved; FRRIV denotes a frequency domain reservation indication value; RBSTART is used for indicating a starting position of a reserved resource block; and LCRRB is used for indicating a number of the reserved resource blocks.

In an implementation, in a case where $RB_{START}=0$, FFRIV=$L_{CRRB}-1$; and in a case where $RB_{START}>0$, FFRIV=$RB_{START}$+min(M, N)−1; where N denotes a number of resource blocks included in a system; M denotes a maximum number of resource blocks that need to be reserved; FRRIV denotes a frequency domain reservation indication value corresponding to frequency domain reservation indication signaling; $RB_{START}$ is used for indicating a starting position of a reserved resource block; $L_{CRRB}$ is used for indicating a number of the reserved resource blocks; and min denotes a minimum value.

In an implementation, the time domain reservation period is one of 5 ms, 10 ms, 20 ms, 40 ms, 80 ms, and 160 ms.

In an implementation, the method further includes:
transmitting reservation resource rewrite indication signaling; where the reservation resource rewrite indication signaling is transmitted through a physical downlink control channel; and the reservation resource rewrite indication signaling indicates that reserved resource in resources corresponding to a physical shared channel corresponding to the physical downlink control channel is rewritten.

In an implementation, the reservation resource rewrite indication signaling indicating that the reserved resource in the resources corresponding to the physical shared channel corresponding to the physical downlink control channel is rewritten includes:
in a case where the reservation resource rewrite indication signaling is 2 bits, it is indicated that time domain reservation within a currently scheduled data transmission duration range is one of four cases described below.

The four cases include the time domain reservation within the currently scheduled data transmission duration range not allowed to be occupied for data transmission, the time domain reservation within a first quarter of the currently scheduled data transmission duration range allowed to be occupied by the data transmission, the time domain reservation within a first half of the currently scheduled data transmission duration range allowed to be occupied by the data transmission, or the time domain reservation within the entire currently scheduled data transmission duration range allowed to be occupied by the data transmission.

In an implementation, the reservation resource rewrite indication signaling indicating that the reserved resource in the resources corresponding to the physical shared channel corresponding to the physical downlink control channel is rewritten includes:

in a case where the reservation resource rewrite indication signaling is 2 bits, it is indicated that time domain reservation within a currently scheduled data transmission duration range is one of four cases described below.

The four cases include the time domain reservation within the currently scheduled data transmission duration range not allowed to be occupied for data transmission, the time domain reservation within a first quarter of the currently scheduled data transmission duration range not allowed to be occupied by the data transmission, the time domain reservation within a first half of the currently scheduled data transmission duration range not allowed to be occupied by the data transmission, or the time domain reservation within the entire currently scheduled data transmission duration range allowed to be occupied by the data transmission.

In an implementation, the reservation resource rewrite indication signaling indicating that the reserved resource in the resources corresponding to the physical shared channel corresponding to the physical downlink control channel is rewritten includes:

in a case where the reservation resource rewrite indication signaling is 2 bits, it is indicated that time domain reservation within a currently scheduled data transmission duration range is one of four cases described below.

The four cases include the time domain reservation within the currently scheduled data transmission duration range not allowed to be occupied for data transmission, the time domain reservation within a first half of the currently scheduled data transmission duration range allowed to be occupied by the data transmission, the time domain reservation within the first half of the currently scheduled data transmission duration range not allowed to be occupied by the data transmission, or the time domain reservation within the entire currently scheduled data transmission duration range allowed to be occupied by the data transmission.

Embodiments of the present application further provide a data receiving method. The data receiving method includes:

receiving first indication signaling transmitted by a base station; where the first indication signaling is used for indicating that first time domain resource is not allowed to be used for transmission.

In an implementation, the first indication signaling includes time domain reservation period information and time domain offset information, and time domain resource information reserved in a time domain reservation period corresponding to the time domain reservation period information.

Time domain resource reserved in the time domain reservation period is represented by a time domain reservation bitmap; and a time domain offset corresponding to the time domain offset information is a distance between a subframe where a starting position of the time domain reservation bitmap in the time domain reservation period is located and a start of the time domain reservation period.

In an implementation, embodiments of the present application further provide a data receiving method. The data receiving method includes:

receiving second indication signaling transmitted by a base station; where the second indication signaling includes reserved time domain resource information used for indicating that frequency domain resource corresponding to reserved time domain resource is not allowed to be used for transmission.

In an implementation, the first indication signaling further includes reserved frequency domain resource information; where the reserved frequency domain resource information is used for indicating that frequency domain resource corresponding to reserved time domain resource is not allowed to be used for transmission.

In an implementation, the method further includes receiving second indication signaling; where the second indication signaling includes reserved frequency domain resource information; where the reserved frequency domain resource information is used for indicating that frequency domain resource corresponding to reserved time domain resource is not allowed to be used for transmission.

In an implementation, in a case where $RB_{START}=0$, $FFRIV=L_{CRRB}-1$; and in a case where $RB_{START}>0$, $FFRIV=RB_{START}+\min(M, N)-1$; where N denotes a number of resource blocks included in a system; M denotes a maximum number of resource blocks that need to be reserved; FRRIV denotes a frequency domain reservation indication value corresponding to frequency domain reservation indication signaling; $RB_{START}$ is used for indicating a starting position of a reserved resource block; $L_{CRRB}$ is used for indicating a number of the reserved resource blocks; and min denotes a minimum value.

In an implementation, the present application further provides a data receiving method. The data receiving method includes:

receiving reservation resource rewrite indication signaling;

where the reservation resource rewrite indication signaling is transmitted through a physical downlink control channel, and the reservation resource rewrite indication signaling indicates that reserved resource in resources corresponding to a physical shared channel corresponding to the physical downlink control channel is rewritten.

Embodiments of the present application further provides a resource indication apparatus. The resource indication apparatus includes a first transmission module.

The first transmission module is configured to transmit first indication signaling to a terminal.

The first indication signaling is used for indicating that first time domain resource is not allowed to be used for transmission.

In an implementation, the resource indication apparatus further includes a second transmission module.

The second transmission module is configured to transmit second indication signaling to the terminal.

The second indication signaling is used for indicating that frequency domain resource corresponding to reserved time domain resource is not allowed to be used for transmission.

Embodiments of the present application further provides a data receiving apparatus. The data receiving apparatus includes a first receiving module.

The first receiving module is configured to receive first indication signaling transmitted by a base station.

The first indication signaling is used for indicating that first time domain resource is not allowed to be used for transmission.

Embodiments of the present application further provide a data receiving apparatus. The data receiving apparatus includes a second receiving module.

The second receiving module is configured to receive second indication signaling transmitted by a base station.

The second indication signaling is used for indicating that frequency domain resource corresponding to reserved time domain resource is not allowed to be used for transmission.

Embodiments of the present application provide a network device. A base station includes a processor and a memory.

The memory is configured to store instructions.

The processor is configured to read the instructions to perform a method applied to the base station in the embodiments of the present application.

Embodiments of the present application provide a communication system including the terminal provided in embodiments of the present application and the base station provided in embodiments of the present application.

Embodiments of the present application provide a storage medium storing a computer program, the computer program, when executed by a processor, performs any one of the methods provided in the embodiments of the present application.

In embodiments of the present application, in a first system, configuring reserved time domain resource for target data of a second system includes:

configuring reservation symbol information in a time domain reservation period, where the time domain reservation period is L subframes; and the reservation symbol information is first S symbols of a reserved time domain reservation period.

In an implementation, a time domain reservation period is a single subframe, and in a first system, configuring reserved time domain resource for target data of a second system includes the following:

reserving first S symbols of the subframe for the second system, where S<=Lstart; and Lstart denotes a length of an LTE downlink control region (LTE legacy control channel region).

In an embodiment of the present application, in a first system, configuring reserved time domain resource for target data of a second system includes:

configuring a slot reservation bitmap in a slot reservation period and a reservation symbol bitmap or reservation symbol information in a reservation symbol period respectively.

Further, the slot reservation period is predefined or configured through signaling; and the reservation symbol period is predefined or configured through signaling.

Further, the slot reservation period may be the same as or different from the reservation symbol period.

In an embodiment of the present application, in a first system, configuring reserved time domain resource for target data of a second system includes:

configuring a slot reservation bitmap, a subframe reservation bitmap, and/or a reservation symbol bitmap in a time domain reservation period, where a length of the slot reservation bitmap is S1 bits, a length of the subframe reservation bitmap is S2 bits, and a length of the reservation symbol bitmap is S3 bits.

Further, in an embodiment of the present application, in a first system, configuring reserved time domain resource for target data of a second system includes: at a distance of $$\left\lceil \frac{S1}{2} \right\rceil$$

subframes from a reserved starting position of a slot, setting resource reservation of S2 subframes through a subframe reservation bitmap, where an optional value of S2 may be 3, 5, 6, 8, or 10.

In an implementation, a time domain reservation period is L1 subframes; and a time domain offset indicates a distance between a subframe where a start of a time domain reservation bitmap in the time domain reservation period is located and a start of the time domain reservation period. The time domain reservation bitmap is a subframe reservation bitmap, and a length of the subframe reservation bitmap is M1.

Further, a time domain reservation period is L2 subframes; and a time domain offset indicates a distance between a subframe where a start of a time domain reservation bitmap in the time domain reservation period is located and a start of the time domain reservation period. The time domain reservation bitmap is a slot reservation bitmap, and a length of the slot reservation bitmap is M2.

Further, a time domain reservation period is L3 subframes; and a time domain offset indicates a distance between a subframe where a time domain reservation bitmap in the time domain reservation period is located and a start of the time domain reservation period. The time domain reservation bitmap is a reservation symbol bitmap, and a length of the reservation symbol bitmap is M3, which satisfies that M3>=1 and M3<14. The time domain offset is predefined or indicated through signaling.

In an implementation of the present application, a reserved narrow band (NB) is indicated through an indication value of X2 bits, P is used for indicating a number of NBs included in a system 1 in a coexistence system, and M is used for indicating a maximum number of frequency domain resource blocks that need to be reserved in frequency domain of a system 2 in the coexistence system.

$$\text{If } P <= \left\lceil \frac{M}{6} \right\rceil,$$

that is, P<=a rounded value of M/6, then X2=$\lceil \log_2(2 \cdot P - 1) \rceil$. Frequency resource reservation indication value 2 (here briefly described as Y2) of a value indicated through X2 bits indicates a starting position $NB_{START}$ of reserved consecutive NBs and a length $L_{CRNB}$ of the reserved consecutive NBs, denoting the reserved consecutive NBs with characteristics described below.

For 0<=Y2<P, Y2 is the same with a maximum NB index of the reserved consecutive NBs, indicating that indexes of the reserved NBs being (Y2+1) consecutive NBs are from 0 to Y2. $NB_{START}=0$ and $L_{CRNB}=Y2+1$.

For $P<=Y2<2P-1$, $(Y2-P+1)$ and a minimum NB index of the reserved consecutive NBs, indicating that indexes of the reserved NBs are from $(Y2-P+1)$ to $(P-1)$. $NB_{START}=(Y2-P+1)$, and $L_{CRNB}=2P-Y2-1$.

$$\text{If } P > \left\lceil \frac{M}{6} \right\rceil, \text{ then } X2 = \left\lceil \log_2\left(P + \left\lceil \frac{M}{6} \right\rceil - 1\right) \right\rceil.$$

Frequency resource reservation indication value 2 (here briefly described as Y2) indicated through X bits indicates a starting position $NB_{START}$ of reserved consecutive NBs and a length $L_{CRNB}$ of the reserved consecutive NBs, denoting the reserved consecutive NBs with characteristics described below.

$$\text{For } 0 <= Y2 < \left\lceil \frac{M}{6} \right\rceil,$$

Y2 is the same as a maximum NB index of the reserved consecutive NBs, indicating that the reserved NBs are $(Y2+1)$ consecutive NBs from NB 0 to NB Y2. $NB_{START}=0$, and $L_{CRNB}=Y2+1$.

$$\text{For } \left\lceil \frac{M}{6} \right\rceil <= Y2 < P,$$

Y2 is the same as the maximum NB index of the reserved consecutive NBs, indicating that the reserved NBs are $$\left\lceil \frac{M}{6} \right\rceil$$

NBs starting from NB $$\left(Y2 - \left\lceil \frac{M}{6} \right\rceil + 1\right).$$

$$NB_{START} = Y2 - \left\lceil \frac{M}{6} \right\rceil + 1, \text{ and } L_{CRNB} = \left\lceil \frac{M}{6} \right\rceil.$$

$$\text{For } P <= Y2 < P + \left\lceil \frac{M}{6} \right\rceil - 1, \left(Y2 - \left\lceil \frac{M}{6} \right\rceil + 1\right)$$

is the same as a minimum NB index of the reserved consecutive NBs, indicating that indexes of the reserved NBs are from $$\left(Y2 - \left\lceil \frac{M}{6} \right\rceil + 1\right) \text{ to } (P-1).$$

$$NB_{START} = Y2 - P + 1, \text{ and } L_{CRNB} = P + \left\lceil \frac{M}{6} \right\rceil - Y2 - 1.$$

Further, a reserved RBG is indicated through X3 bits, where N denotes a number of resource blocks included in a system 1 in a coexistence system, a number Q of RBGs included in the coexistence system is equal to $$\left\lceil \frac{N}{T} \right\rceil,$$

T denotes a number of resource blocks included in the RBG, and M denotes a maximum number of frequency domain resource blocks reserved in frequency domain of a system 2 in the coexistence system.

$$\text{If } Q <= \left\lceil \frac{M}{T} \right\rceil, X3 = \left\lceil \log_2(2 \cdot Q - 1) \right\rceil.$$

Frequency resource reservation indication value 3 (here briefly described as Y3) indicated through X3 bits indicates a starting position $RBG_{START}$ of reserved consecutive RBGs and a length $L_{CRRBG}$ of the reserved consecutive RBGs, denoting the reserved consecutive RBGs with characteristics described below.

For $0<=Y3<Q$, Y3 has the same index as a maximum RBG index of the reserved consecutive RBGs and indicates that the reserved RBGs are $(Y3+1)$ consecutive RBGs from RBG 0 to RBG Y3. $RBG_{START}=0$, and $L_{CRRBG}=Y3+1$.

For $Q<=Y3<2Q-1$, $(Y3-Q+1)$ is the same as a minimum RBG index of the reserved consecutive RBGs, indicating that indexes of the reserved RBGs are from $(Y3-Q+1)$ to $(Q-1)$.

$$RBG_{START}=Y3-Q+1, \text{ and } L_{CRRBG}=2Q-Y3-1. \text{ If } Q > \left\lceil \frac{M}{T} \right\rceil,$$

$$\text{then } X3 = \left\lceil \log_2\left(Q + \left\lceil \frac{M}{T} \right\rceil - 1\right) \right\rceil.$$

Y3 indicated through X3 bits denotes the reserved consecutive RBGs with characteristics described below.

$$\text{For } 0 <= Y3 < \left\lceil \frac{M}{T} \right\rceil,$$

Y3 is the same as the maximum RBG index of the reserved consecutive RBGs, indicating that the reserved RBGs are $(Y3+1)$ consecutive RBGs from RBG 0 to RBG Y3. $RBG_{START}=0$, and $L_{CRRBG}=Y3+1$.

$$\text{For } \left\lceil \frac{M}{T} \right\rceil <= Y3 < Q,$$

Y3 is the same as the maximum RBG index of the reserved consecutive RBGs, indicating that the reserved RBGs are $$\left\lceil \frac{M}{T} \right\rceil$$

RBGs starting from RBG $$\left(Y3 - \left\lceil \frac{M}{T} \right\rceil + 1\right).$$

$$RBG_{START} = Y3 - \left\lceil \frac{M}{T} \right\rceil + 1, \text{ and } L_{CRRBG} = \left\lceil \frac{M}{T} \right\rceil.$$

$$\text{For } Q <= Y3 < Q + \left\lceil \frac{M}{T} \right\rceil - 1, \left(Y3 - \left\lceil \frac{M}{T} \right\rceil + 1\right)$$

is the same as the minimum RBG index of the reserved consecutive RBGs, indicating that indexes the reserved RBGs are from $$\left(Y3 - \left\lceil \frac{M}{T} \right\rceil + 1\right) \text{ to } (Q-1). \ RBG_{START} = Y3 - Q + 1,$$

$$\text{and } L_{CRRBG} = Q + \left\lceil \frac{M}{T} \right\rceil - Y3 - 1.$$

In a specific implementation manner, reserved time-frequency domain resources, that is, two-dimensional resources combining the time domain and the frequency domain, are divided into dynamically unchangeable reserved time-frequency domain resources or dynamically changeable reserved time-frequency domain resources.

Time-frequency domain reservation resources in a system are dynamically activated or deactivated. Thus, the time-frequency domain reservation resources refer to the dynamically changeable reserved time-frequency domain resources.

When being dynamically activated, the time-frequency domain reservation resources can be used by the system.

Further, signaling for dynamically activating the time-frequency domain reservation resources includes configuration of a timer for activation duration. The signaling is transmitted from a base station to a user equipment. Before the timer for activation duration expires, the time-frequency domain reservation resources can be used by the system; after the timer for activation duration expires, the time-frequency domain reservation resources cannot be used by the system.

Further, the timer for activation duration for dynamically activating the time-frequency domain resources is predefined.

The time domain reservation resource in the system is dynamically rewritten. The time-frequency domain reservation resources refer to the dynamically changeable time-frequency domain resources.

For reserved subframe resource or slot resource, before a timer for rewrite expires, some symbols in the subframe or in the slot can be used by the system, where the subframe or the slot is dynamically configured.

A duration of the timer for rewrite may be predefined or configured through signaling.

Further, part or all of time domain reservation within a currently scheduled data transmission duration range is dynamically rewritten.

A one-bit dynamic rewrite indication value indicates whether the time domain reservation within the currently scheduled data transmission duration range can be occupied for data transmission.

A two-bit dynamic rewrite indication value indicates whether part or all of the time domain reservation within the currently scheduled data transmission duration range can be occupied by the data transmission.

Specifically, the two-bit dynamic rewrite indication value indicates that the time domain reservation within the currently scheduled data transmission duration range is one of four cases described below.

The four cases include the time domain reservation within the currently scheduled data transmission duration range not allowed to be occupied for data transmission, the time domain reservation within a first quarter of the currently scheduled data transmission duration range allowed to be occupied by the data transmission, the time domain reservation within a first half of the currently scheduled data transmission duration range allowed to be occupied by the data transmission, or the time domain reservation within the currently scheduled data transmission duration range allowed to be occupied by the data transmission.

Specifically, the two-bit dynamic rewrite indication value indicates that the time domain reservation within the currently scheduled data transmission duration range is one of four cases described below.

The four cases include the time domain reservation within the currently scheduled data transmission duration range not allowed to be occupied for data transmission, the time domain reservation within a first quarter of the currently scheduled data transmission duration range not allowed to be occupied by the data transmission, the time domain reservation within a first half of the currently scheduled data transmission duration range not allowed to be occupied by the data transmission, or the time domain reservation within the currently scheduled data transmission duration range allowed to be occupied by the data transmission.

Specifically, the two-bit dynamic rewrite indication value indicates that the time domain reservation within the currently scheduled data transmission duration range is one of four cases described below.

The four cases include the time domain reservation within the currently scheduled data transmission duration range not allowed to be occupied for data transmission, the time domain reservation within a first half of the currently scheduled data transmission duration range allowed to be occupied by the data transmission, the time domain reservation within the first half of the currently scheduled data transmission duration range not allowed to be occupied by the data transmission, or the time domain reservation within the currently scheduled data transmission duration range allowed to be occupied by the data transmission.

The embodiments of the present application can solve the problems in transmission of important resources in a case where two systems coexist, achieving that the two systems transmit important data without affecting each other, data conflicts are avoided and system overhead is saved.

IV. BRIEF DESCRIPTION OF DRAWINGS

V. DETAILED DESCRIPTION

Embodiments of the present application are described hereinafter in conjunction with drawings. It is to be noted that if not in collision, embodiments of the present application and features therein may be combined with each other in any manner.

Figure 1:
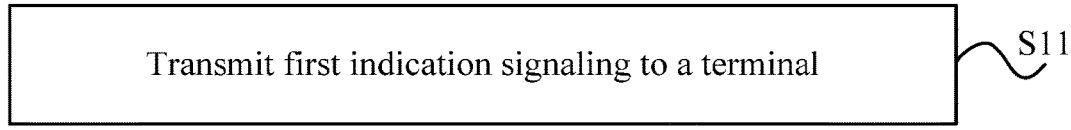
FIG. 1 is a flowchart of a resource indication method according to an embodiment of the present application.

As shown in FIG. 1, a resource indication method provided in an embodiment of the present embodiment includes:

first indication signaling is transmitted to a terminal (S11).

The first indication signaling includes reserved time domain resource information used for indicating that first time domain resource is not allowed to be used for transmission.

In an embodiment of the present application, the indication signaling is used for configuring reserved time domain resource and/or frequency domain resource.

In an embodiment of the present application, the time domain resource is used for transmitting, in a first system, target data of a second system; and the first system and the second system share a same spectrum resource.

In an embodiment of the present application, the first system may be an LTE-MTC system or an NB-IoT system. The second system may be an NR system.

In an embodiment of the present application, in a case where the second system is the NR system, the first time domain resource may be used for transmitting a synchronization signal block (SSB) and/or a common control channel block Control-Resource Set 0 (CORESET 0) of the NR system.

In an embodiment of the present application, signaling is used for indicating that the first time domain resource cannot be used for transmission so that the first time domain resource may be reserved for another system, thereby ensuring transmission of important data in a case where two systems share the same spectrum resource.

In an embodiment, a time domain reservation period is configured so that the reserved time domain resource is configured, and a time domain resource configuration status in the time domain reservation period is indicated through a time domain reservation bitmap or a time domain reservation indication value.

In an embodiment, the time domain reservation period may be any time value, for example, the time domain reservation period is one of 5 ms, 10 ms, 20 ms, 40 ms, 80 ms, and 160 ms. In an embodiment of the present application, in a case where the second system is the NR system, the target data may be the SSB and/or the CORESET 0 of the NR system.

Figure 2:
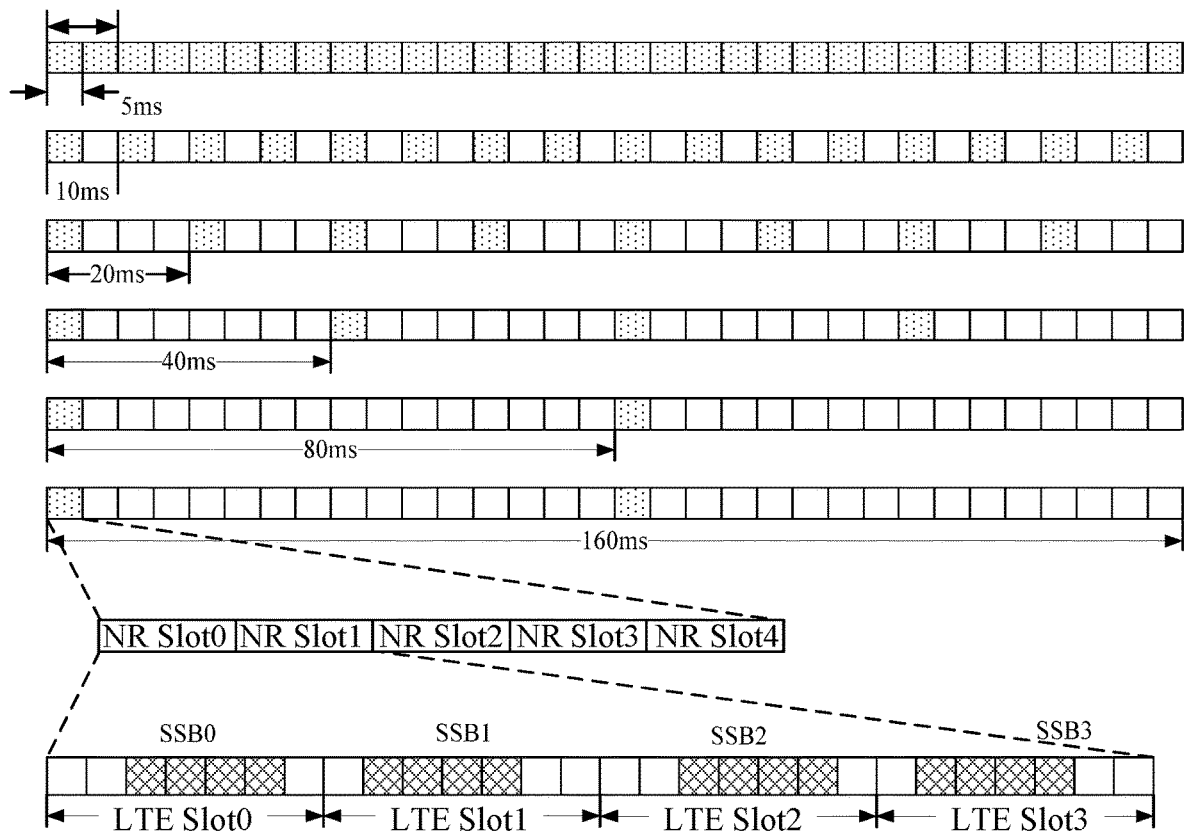
FIG. 2 is a schematic diagram of time domain resource reservation according to an embodiment of the present application.
Figure 3:
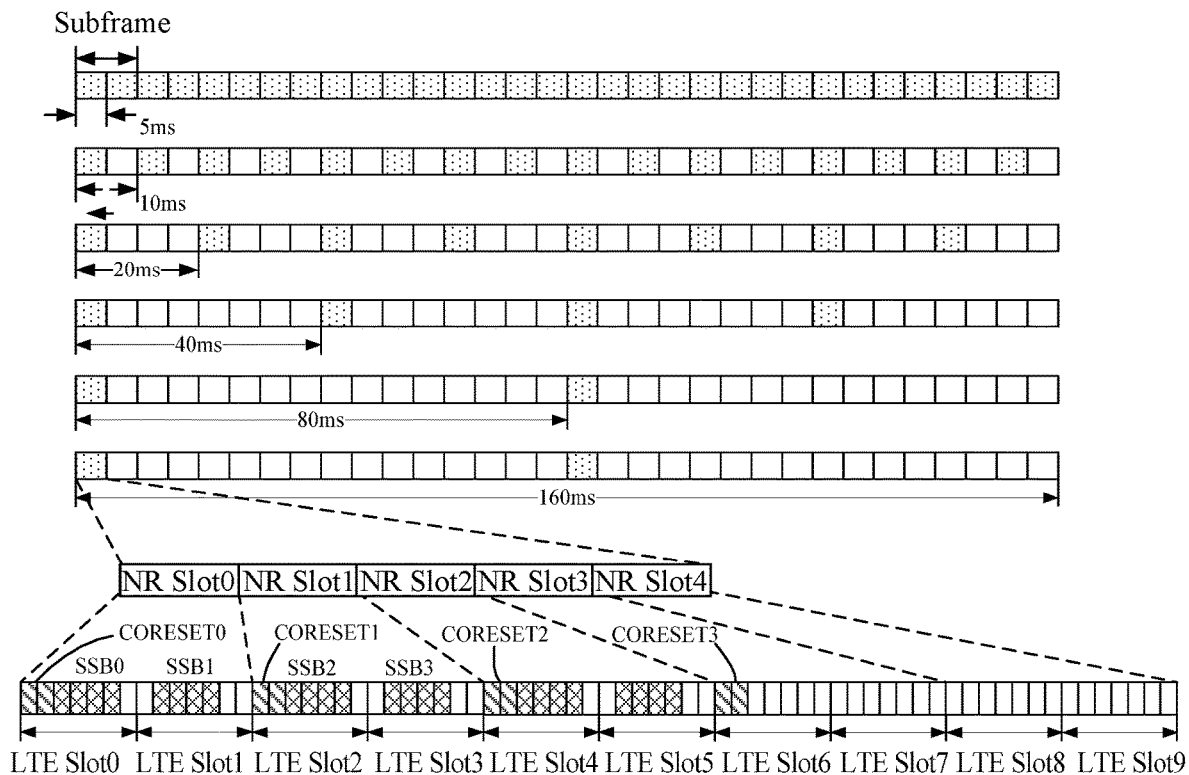
FIG. 3 is a schematic diagram of time domain resource reservation according to an embodiment of the present application.

In examples shown in FIGS. 2 and 3, a half radio frame (frame) includes five NR slots and 10 LTE slots. Within a half radio frame, for the 15 kHz subcarrier spacing configuration in a coexistence system, the SSB is transmitted mostly for four times, occupying 4 symbol bits each time. The CORESET 0 is also transmitted for 4 times, occupying 2 symbol bits each time. In a case where the target data is the SSB, four symbol bits are reserved for the SSB in first four LTE slots of a half subframe. In a case where the target data is the SSB and the CORESET 0, first two symbol bits are reserved for the CORESET 0 in LTE slot0 and LTE slot2, respectively, the 2nd, 3rd, 4th, and 5th symbol bits are reserved for the SSB in LTE slot1 and LTE slot3, respectively, and first two symbol bits are reserved for the CORESET 0 in LTE slot4 and LTE slot6, respectively.

In an embodiment, the first indication signaling includes time domain reservation period information and time domain offset information, and time domain resource information reserved in a time domain reservation period corresponding to the time domain reservation period information. Time domain resource reserved in the time domain reservation period is represented by a time domain reservation bitmap; and a time domain offset corresponding to the time domain offset information is a distance between a subframe where a starting position of the time domain reservation bitmap in the time domain reservation period is located and a start of the time domain reservation period.

In an embodiment, the time domain reservation period information and the time domain offset information are jointly indicated through 6 bits.

In an embodiment, the time domain reservation period is indicated through 3 bits; and the time domain offset is indicated through 5 bits.

In an embodiment, according to a possible value range of the time domain reservation period, the time domain reservation period is indicated through 3 bits so that all possible transmission periods of important target data in the NR system can be included. According to a possible value range of the time domain offset, the time domain offset is indicated through 5 bits so that all possibly required time domain offset ranges of the important target data in the NR system can be included.

In other embodiments, the indication value may also have other lengths, for example, the time domain reservation period is indicated by a bit value greater than 3, such as 4 bits, 5 bits, and 6 bits, and the time domain offset is indicated by a bit value greater than 5, such as 6 bits, 7 bits, and 8 bits. The time domain reservation period and the time domain offset may also be jointly indicated by a bit value greater than 6.

In an embodiment, the time domain reservation bitmap includes a slot reservation bitmap used for indicating a reserved slot in the time domain reservation period.

In an embodiment of the present application, one or more bits in the slot reservation bitmap may be set to a certain value, for example, may be set to 0 or 1, indicating that slot resource corresponding to the bit is reserved for the second system.

In an embodiment of the present application, a length of the slot reservation bitmap may be determined as required, for example, the length is 4 bits or 10 bits.

In an embodiment, in a case where a bit corresponding to the slot reservation bitmap is set to a first value, a symbol actually reserved in a slot is determined according to a parity of a slot index. If the slot index is an odd number, the reserved symbol in the slot is determined according to one corresponding method, and if the slot index is an even number, the reserved symbol in the slot is determined according to another corresponding method.

In an embodiment, in a case where the bit corresponding to the slot reservation bitmap is set to the first value, for even-numbered slots, the 3rd, 4th, 5th, and 6th symbols on the slot are reserved for another system to use; and in a case where the bit corresponding to the slot reservation bitmap is set to the first value, for odd-numbered slots, the 2nd, 3rd, 4th, and 5th symbols on the slot are reserved for another system to use.

In another embodiment, in a case where the bit corresponding to the slot reservation bitmap is set to the first value, for odd-numbered slots, the 3rd, 4th, 5th, and 6th symbols on the slot are reserved for another system to use; and for even-numbered slots, the 2nd, 3rd, 4th, and 5th symbols on the slot are reserved for by another system to use.

In an embodiment, a length of the slot reservation bitmap is determined as required, for example, the length is 4 bits or 10 bits.

In an embodiment of the present application, the reserved resource may be used for transmitting target data. In an embodiment of the present application, the target data may be the SSB or the CORESET 0 in the NR system.

In an embodiment, the time domain reservation bitmap includes a reservation symbol bitmap used for indicating a reserved symbol in the time domain reservation period.

In an embodiment, the time domain reservation bitmap includes a subframe reservation bitmap used for indicating the reserved symbol in the time domain reservation period; where a case in which the bit corresponding to the subframe reservation bitmap is the first value, indicates that a preset symbol bit in the corresponding subframe is reserved.

A subframe includes multiple symbols. In an embodiment of the present application, which subframe is an invalid subframe can be known through the subframe reserved bitmap. By pre-defining or in other ways, specific one or more symbols in the subframe may be configured to be reserved for target data.

In an embodiment, in a case where a bit corresponding to the subframe reservation bitmap is set to the first value, at least one symbol bit in the corresponding subframe is reserved.

In an embodiment, a pre-configured manner may be used to specify that at least one symbol bit in the subframe reserved for the second system is reserved.

In an embodiment, in a case where a bit corresponding to the subframe reservation bitmap is set to the first value, a preset symbol bit in the corresponding subframe is reserved for the second system for use.

In an embodiment, at least one symbol bit in the subframe reserved for the target data may be pre-configured to be an invalid symbol bit.

In an embodiment, the time domain reservation bitmap includes a subframe reservation bitmap and a reservation symbol bitmap, and configuring, through the time domain reservation bitmap, the time domain resource in the time domain reservation period includes configuring, according to the subframe reservation bitmap and the reservation symbol bitmap, a reserved symbol in the time domain reservation period.

In an embodiment, the reserved subframe reserved for the target data may be configured through the subframe reservation bitmap, and the reserved symbol of the target data in the reserved subframe may be configured through the reservation symbol bitmap.

In an embodiment, configuring, through the subframe reservation bitmap and the reservation symbol bitmap, the reserved symbol of the target data in the time domain reservation period includes in a case where a bit corresponding to the subframe reservation bitmap is set to the first value, configuring, according to the reservation symbol bitmap, the reserved symbol in the corresponding subframe in the time domain reservation period.

In an embodiment, a length of the subframe reservation bitmap may be determined as required, for example, the length is 2 bits, 5 bits, or 10 bits.

In an embodiment, a value of the length of the subframe reservation bitmap is determined according to a length of the target data.

In an embodiment, a length of the reservation symbol bitmap is determined as required, for example, the length is 2 bits, 7 bits, 14 bits, 28 bits, 70 bits, 7-$L_{start}$ bits, or 14-$L_{start}$ bits; and $L_{start}$ denotes a length of an LTE downlink control region.

In an embodiment, a value of the length of the reservation symbol bitmap is determined according to the length of the target data.

In an embodiment, the first value may be 1 or 0.

In an embodiment, in a case where a bit in the slot reservation bitmap, the subframe reservation bitmap, or the reservation symbol bitmap may be set to 1 or 0, it is indicated that resource corresponding to the bit is reserved for the target data, that is, the target data is transmitted through the resource corresponding to the bit.

In an embodiment, configuring, through the time domain reservation bitmap, the time domain resource in the time domain reservation period includes configuring a reserved slot according to the set slot reservation bitmap; after the reserved slot, configuring a reserved subframe according to the set subframe reservation bitmap; and in the reserved subframe, configuring a reserved symbol according to the set reservation symbol bitmap.

In an embodiment, the reserved slot, the reserved subframe, and the reserved symbol are a slot, a subframe, and a symbol in the time domain reservation period, respectively.

In an embodiment, the reserved subframe is half of S1 subframes after a starting position of the reserved slot, and S1 denotes the length of the slot reservation bitmap.

In an embodiment, the reserved slot occupies a length of the half of 51 subframes, and the reserved subframe is configured immediately after the reserved slot.

In an embodiment, a length of the subframe reservation bitmap may be determined as required, for example, the length is 3 bits, 5 bits, 6 bits, 8 bits, or 10 bits.

In an embodiment, the length of the subframe reservation bitmap is configured according to the length of the target data.

In an embodiment, the length of the reservation symbol bitmap is determined as required, for example, the length is 2 bits, 7 bits, 14 bits, 7-$L_{start}$ bits, or 4-$L_{start}$ bits; and $L_{start}$ denotes the length of the LTE downlink control region (LTE legacy control channel region).

In an embodiment, the length of the reservation symbol bitmap is configured according to the length of the target data.

In an embodiment, configuring the reserved time domain resource includes configuring reserved subframes of a second value according to a preset configuration method, where symbol bits of a first third value in the reserved subframe are reserved symbols configured for the target data.

In an embodiment of the present application, the reserved resource may also be configured in a pre-defining manner. Corresponding reserved resource may be directly configured without a bitmap by presetting an indication value or in a pre-defining manner.

In an embodiment, in a case where the time domain reservation period is a single subframe, first fourth value symbols in the subframe are reserved, where the fourth value<=$L_{start}$; in a case where the time domain reservation period is two subframes, symbols of a first fifth value in even-numbered subframes are reserved, where the fifth value<=$L_{start}$; $L_{start}$ denotes the length of the LTE downlink control region (LTE legacy control channel region).

The preceding configuration methods may be predefined through protocols or in other manners without setting a dedicated bitmap.

In an embodiment, configuring the reserved time domain resource includes configuring the reserved time domain resource of the target data in a predefined reservation period according to the set slot reservation bitmap and the set reservation symbol bitmap.

In an embodiment, the reservation period may be configured in a pre-defining manner, and then specific time domain resource reserved in the reservation period may be configured in conjunction with the bitmap.

In an embodiment, the method further includes configuring reserved frequency domain resource for the target data; where the reserved frequency domain resource is used for transmitting the target data.

In an embodiment, the reserved frequency domain resource includes at least one consecutive resource block, or at least one consecutive NB, or at least one consecutive RBG; configuring the reserved frequency domain resource includes determining a starting position and a number of reserved frequency domain resources according to a preset frequency domain indication value.

In an embodiment of the present application, the reserved frequency domain resource is configured mainly by setting a frequency domain indication value.

In an embodiment, in a case where a number of resource blocks included in the first system does not exceed a maximum number of resource blocks that need to be reserved by the second system, then for 0<=FRRIV<N, FRRIV has the same index as a maximum resource block index of the reserved consecutive resource blocks, and the reserved resource blocks are (FRRIV+1) resource blocks from resource block 0 to resource block FRRIV, where $RB_{START}$=0, $L_{CRRB}$=FRRIV+1; for N<=FRRIV<2N-1, the reserved resource blocks are consecutive resource blocks starting from $RB_{START}$=(FRRIV-N+1), indicating that indexes of the reserved resource blocks are from (FRRIV-N+1) to (N-1), where $L_{CRRB}$=2N-FRRIV-1; where N denotes the number of the resource blocks included in the first system, FRRIV denotes a frequency domain reservation indicator value, $RB_{START}$ is used for indicating a starting position of the resource block, and $L_{CRRB}$ is used for indicating the number of the resource blocks.

In an embodiment, in a case where the number of the resource blocks included in the first system exceeds the maximum value of the number of the resource blocks that need to be reserved for the second system, then for 0<=FRRIV<N, FRRIV has the same index as the maximum resource block index of the consecutive resource blocks, and the reserved resource blocks are (FRRIV+1) consecutive resource blocks from resource block 0 to resource block FRRIV, where $RB_{START}$=0, and $L_{CRRB}$=FRRIV+1; for M<=FRRIV<N, FRRIV has the same index as the maximum resource block index of the reserved consecutive resource blocks, and the reserved resource blocks are M consecutive resource blocks starting from resource block (FRRIV-M+1), where $RB_{START}$=FRRIV-M+1, $L_{CRRB}$=M; for N<=FRRIV<N+M-1, (FRRIV-M+1) has the same index as a minimum resource block index of the reserved consecutive resource blocks, and indexes of the reserved consecutive resource blocks are from (FRRIV-M+1) to (N-1), where $RB_{START}$=(FRRIV-M+1), $L_{CRRB}$=N+M-FRRIV-1; where N denotes the number of the resource blocks included in the first system, M denotes the maximum value of the number of the resource blocks that need to be reserved by the second system, FRRIV denotes the frequency domain indication value, $RB_{START}$ is used for indicating the starting position of the resource blocks, $L_{CRRB}$ is used for indicating the number of the resource blocks.

In an embodiment, the time domain reservation period is one of 5 ms, 10 ms, 20 ms, 40 ms, 80 ms, and 160 ms.

The method further includes transmitting reservation resource rewrite indication signaling; where the reservation resource rewrite indication signaling is transmitted through a physical downlink control channel; and the reservation resource rewrite indication signaling indicates that reserved resource in resources corresponding to a physical shared channel corresponding to the physical downlink control channel is rewritten.

A length of the reservation resource rewrite indication signaling may be determined as required. The reservation resource rewrite indication signaling indicating that the reserved resource in the resources corresponding to the physical shared channel corresponding to the physical downlink control channel is rewritten includes a case in which the reservation resource rewrite indication signaling is 2 bits, indicates that time domain reservation within a currently scheduled data transmission duration range is one of the following four cases: the time domain reservation within the currently scheduled data transmission duration range not allowed to be occupied for data transmission, the time domain reservation within a first quarter of the currently scheduled data transmission duration range allowed to be occupied by the data transmission, the time domain reservation within a first half of the currently scheduled data transmission duration range allowed to be occupied by the data transmission, or the time domain reservation within the entire currently scheduled data transmission duration range allowed to be occupied by the data transmission.

In an embodiment, the reservation resource rewrite indication signaling indicating that the reserved resource in the resources corresponding to the physical shared channel corresponding to the physical downlink control channel is rewritten includes a case in which the reservation resource rewrite indication signaling is 2 bits, indicates that time domain reservation within a currently scheduled data transmission duration range is one of the following four cases: the time domain reservation within the currently scheduled data transmission duration range not allowed to be occupied for data transmission, the time domain reservation within a first quarter of the currently scheduled data transmission duration range not allowed to be occupied by the data transmission, the time domain reservation within a first half of the currently scheduled data transmission duration range not allowed to be occupied by the data transmission, or the time domain reservation within the entire currently scheduled data transmission duration range allowed to be occupied by the data transmission.

In an embodiment, the reservation resource rewrite indication signaling indicating that the reserved resource in the resources corresponding to the physical shared channel corresponding to the physical downlink control channel is rewritten includes in a case where the reservation resource rewrite indication signaling is 2 bits, indicating that time domain reservation within a currently scheduled data transmission duration range is one of the following four cases: the time domain reservation within the currently scheduled data transmission duration range not allowed to be occupied for data transmission, the time domain reservation within a first half of the currently scheduled data transmission duration range allowed to be occupied by the data transmission, the time domain reservation within the first half of the currently scheduled data transmission duration range not allowed to be occupied by the data transmission, or the time domain reservation within the entire currently scheduled data transmission duration range allowed to be occupied by the data transmission.

Figure 4:
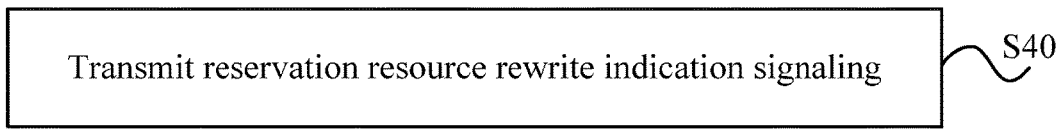
FIG. 4 is a flowchart of a resource indication method according to an embodiment of the present application.

An embodiment of the present application provides a resource indication method. As shown in FIG. 4, the method includes:

reservation resource rewrite indication signaling is transmitted (S40).

The reservation resource rewrite indication signaling is transmitted through a physical downlink control channel; and the reservation resource rewrite indication signaling indicates that reserved resource in resources corresponding to a physical shared channel corresponding to the physical downlink control channel is rewritten.

In an embodiment, the reservation resource rewrite indication signaling indicating that the reserved resource in the resources corresponding to the physical shared channel corresponding to the physical downlink control channel is rewritten includes a case in which the reservation resource rewrite indication signaling is 2 bits, indicates that time domain reservation within a currently scheduled data transmission duration range is one of the following four cases: the time domain reservation within the currently scheduled data transmission duration range not allowed to be occupied for data transmission, the time domain reservation within a first quarter of the currently scheduled data transmission duration range allowed to be occupied by the data transmission, the time domain reservation within a first half of the currently scheduled data transmission duration range allowed to be occupied by the data transmission, or the time domain reservation within the entire currently scheduled data transmission duration range allowed to be occupied by the data transmission.

In an embodiment, the reservation resource rewrite indication signaling indicating that the reserved resource in the resources corresponding to the physical shared channel corresponding to the physical downlink control channel is rewritten includes a case in which the reservation resource rewrite indication signaling is 2 bits, indicates that time domain reservation within a currently scheduled data transmission duration range is one of the following four cases: the time domain reservation within the currently scheduled data transmission duration range not allowed to be occupied for data transmission, the time domain reservation within a first quarter of the currently scheduled data transmission duration range not allowed to be occupied by the data transmission, the time domain reservation within a first half of the currently scheduled data transmission duration range not allowed to be occupied by the data transmission, or the time domain reservation within the entire currently scheduled data transmission duration range allowed to be occupied by the data transmission.

In an embodiment, the reservation resource rewrite indication signaling indicating that the reserved resource in the resources corresponding to the physical shared channel corresponding to the physical downlink control channel is rewritten includes a case in which the reservation resource rewrite indication signaling is 2 bits, indicates that time domain reservation within a currently scheduled data transmission duration range is one of the following four cases: the time domain reservation within the currently scheduled data transmission duration range not allowed to be occupied for data transmission, the time domain reservation within a first half of the currently scheduled data transmission duration range allowed to be occupied by the data transmission, the time domain reservation within the first half of the currently scheduled data transmission duration range not allowed to be occupied by the data transmission, or the time domain reservation within the entire currently scheduled data transmission duration range allowed to be occupied by the data transmission.

Figure 5:
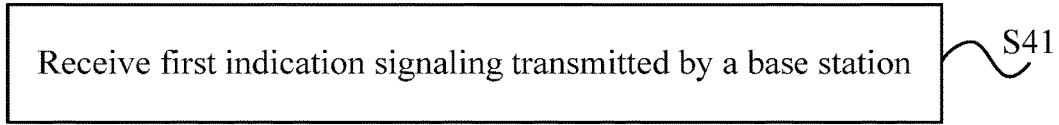
FIG. 5 is a flowchart of a data receiving method according to an embodiment of the present application.

An embodiment of the present application further provides a data receiving method. As shown in FIG. 5, the method includes:

first indication signaling transmitted by a base station is received (S41).

The first indication signaling includes reserved time domain resource information used for indicating that first time domain resource is not allowed to be used for transmission.

In an embodiment, the first indication signaling includes time domain reservation period information and time domain offset information, and time domain resource information reserved in a time domain reservation period corresponding to the time domain reservation period information. Time domain resource reserved in the time domain reservation period is represented by a time domain reservation bitmap; and a time domain offset corresponding to the time domain offset information is a distance between a subframe where a starting position of the time domain reservation bitmap in the time domain reservation period is located and a start of the time domain reservation period.

In an embodiment, an embodiment of the present application further provides a resource indication method. The method includes receiving second indication signaling transmitted by a base station; where the second indication signaling is used for indicating that frequency domain resource corresponding to reserved time domain resource is not allowed to be used for transmission.

In an embodiment, in a case where $RB_{START}=0$, $FFRIV=L_{CRRB}-1$; and in a case where $RB_{START}>0$, $FFRIV=RB_{START}+Min(M, N)-1$; where N denotes a number of resource blocks included in a system; M denotes a maximum number of resource blocks that need to be reserved; FRRIV denotes a frequency domain reservation indication value corresponding to frequency domain reservation indication signaling; $RB_{START}$ is used for indicating a starting position of a reserved resource block; $L_{CRRB}$ is used for indicating a number of the reserved resource blocks; and min denotes a minimum value.

In an embodiment, the method provided in the present application further includes transmitting reservation resource rewrite indication signaling; where the reservation resource rewrite indication signaling is transmitted through a physical downlink control channel; and the reservation resource rewrite indication signaling indicates that reserved resource in resources corresponding to a physical shared channel corresponding to the physical downlink control channel is rewritten.

In an embodiment of the present application, the data receiving method is used for data transmitted by resource indicated by the resource indication method provided in any embodiment of the present application.

Embodiment One

This embodiment is used for solving the coexistence of the NR system and the LTE-MTC/NB-IoT system and includes configuring a time domain reservation period, where the time domain reservation period is one of 5 ms, 10 ms, 20 ms, 40 ms, 80 ms, or 160 ms.

Configuring the time domain reservation period further includes configuring a time domain offset by pre-defining or transmitting signaling, where the time domain offset indicates a distance between a starting position of a half frame (5 ms half frame) where a time domain reservation bitmap in the time domain reservation period is located and a start of the time domain reservation period.

In a case where the time domain reservation period is 5 ms, the time domain offset is Oms by default.

In a case where the time domain reservation period is 10 ms, the time domain offset is Oms or 5 ms.

In a case where the time domain reservation period is 20 ms, the time domain offset is Oms, 5 ms, 10 ms, or 15 ms.

In a case where the time domain reservation period is 40 ms, the time domain offset is Oms, 5 ms, 10 ms, 15 ms, 20 ms, 25 ms, 30 ms, or 35 ms.

In a case where the time domain reservation period is 80 ms, the time domain offset is Oms, 5 ms, 10 ms, 15 ms, 20 ms, 25 ms, 30 ms, 35 ms, 40 ms, 45 ms, 50 ms, 55 ms, 60 ms, 65 ms, 70 ms, or 75 ms.

In a case where the time domain reservation period is 80 ms, the time domain offset is Oms, 5 ms, 10 ms, 15 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 105 ms, 110 ms, 115 ms, 120 ms, 125 ms, 130 ms, 135 ms, 140 ms, 145 ms, 150 ms, or 155 ms.

A slot reservation period and a slot offset are separately indicated or jointly indicated by the time domain reservation indication value. The time domain reservation period is indicated through 3 bits, the slot offset is indicated through 5 bits, and the time domain reservation period and the slot offset are indicated through 6 bits.

Configuring the time domain reservation period further includes configuring a slot reservation bitmap in the time domain reservation period.

A length of the slot reservation bitmap is M bits, where an optional value of M is 4 or 10.

In a case where a bit corresponding to the slot reservation bitmap is set to 1, the corresponding slot is reserved for another system to use.

In a case where the bit corresponding to the slot reservation bitmap is set to 1, then for even-numbered slots, the 3rd, 4th, 5th, and 6th symbols on the slot are reserved for another system to use.

In a case where the bit corresponding to the slot reservation bitmap is set to 1, then for odd-numbered slots, the 2nd, 3rd, 4th, and 5th symbols on the slot are reserved for another system to use.

In a case where configured time-frequency domain resources belong to the first system and target data belongs to the second system, the embodiment of the present application can solve the problem of effective transmission of important data of the first system and the second system In a case where the two systems coexist.

Through the method in this embodiment, the transmission conflict with the SSB in the NR can be effectively avoided in the time domain, and meanwhile, the overhead and waste of resources are reduced.

Embodiment Two

This embodiment is used for solving the coexistence of the NR system and the LTE-MTC/NB-IoT system and includes configuring a time domain reservation period, where the time domain reservation period is one of 5 ms, 10 ms, 20 ms, 40 ms, 80 ms, or 160 ms.

Configuring the time domain reservation period further includes configuring a time domain offset by pre-defining or transmitting signaling, where the time domain offset indicates a distance between a starting position of a half frame (5 ms half frame) where a time domain reservation bitmap in the time domain reservation period is located and a start of the time domain reservation period.

Configuring the time domain offset by pre-defining or transmitting signaling further includes separately or jointly indicating a slot reservation period and a slot offset by a time domain offset indication value. The time domain reservation period is indicated through 3 bits, the slot offset is indicated through 5 bits, and the time domain reservation period and the slot offset are indicated through 6 bits.

Configuring the time domain reservation period further includes configuring a subframe reservation bitmap and/or a reservation symbol bitmap in the time domain reservation period. An optional value of a length of the subframe reservation bitmap is 5 bits, 2 bits, or 10 bits.

In a case where the length of the subframe reservation bitmap is 2 bits, the 3rd, 4th, 5th, and 6th subframes are not reserved for other systems by default.

In a case where a bit corresponding to the subframe reservation bitmap is set to 1, it is indicated that at least one symbol in the corresponding subframe needs to be reserved for other systems for use.

For a subframe with a bit corresponding to the subframe reservation bitmap being set to 1, a reserved symbol position in the subframe is predefined.

Alternatively, for a subframe with a bit corresponding to the subframe reservation bitmap being set to 1, a reservation symbol bitmap in the subframe is configured. A length of the reservation symbol bitmap in the subframe is 2 bits, 7 bits, 14 bits, 7-$L_{start}$ bits, or 14-$L_{start}$ bits. $L_{start}$ denotes the length of the LTE downlink control region (LTE legacy control channel region).

In a case where configured time domain resource belongs to the first system and target data belongs to the second system, the embodiment of the present application can solve the problem of effective transmission of important data of the first system and the second system in a case where the two systems coexist.

Through the method in this embodiment, the transmission conflict with the SSB and/or the CORESET 0 in the NR can be effectively avoided in the time domain, and meanwhile, the overhead and waste of resources are reduced.

Embodiment Three

This embodiment provides a resource indication method that is used for solving the coexistence of the NR system and the LTE-MTC/NB-IoT system and includes configuring a time domain reservation period, where the time domain reservation period is one of 5 ms, 10 ms, 20 ms, 40 ms, 80 ms, or 160 ms.

Configuring the time domain reservation period includes configuring a time domain offset by pre-defining or transmitting signaling, where the time domain offset indicates a distance between a starting position of a half frame (5 ms half frame) where a time domain reservation bitmap in the time domain reservation period is located and a start of the time domain reservation period. A slot reservation period and a slot offset are indicated separately or jointly. The time domain reservation period is indicated through 3 bits, the slot offset is indicated through 5 bits, and the time domain reservation period and the slot offset are indicated through 6 bits.

Configuring the time domain reservation period further includes configuring a reservation symbol bitmap in the time domain reservation period. A length of the reservation symbol bitmap may be predefined or configurable.

Optionally, the length of the reservation symbol bitmap may be 7 bits, 14 bits, 28 bits, or 70 bits.

In a case where configured time domain resource belongs to the first system and target data belongs to the second system, the embodiment of the present application can solve the problem of effective transmission of important data of the first system and the second system In a case where the two systems coexist.

Through the method in this embodiment, the transmission conflict with the SSB, the CORESET 0 and the like in the NR can be effectively avoided in the time domain, and the flexibility is high.

Embodiment Four

This embodiment provides a resource indication method that is used for solving the coexistence of the NR system and the LTE-MTC/NB-IoT system and includes configuring a time domain reservation period, where the time domain reservation period is one of 5 ms, 10 ms, 20 ms, 40 ms, 80 ms, or 160 ms.

Configuring the time domain reservation period further includes configuring a time domain offset, where the time domain offset indicates a distance between a starting position of a half frame (5 ms half frame) where a time domain reservation bitmap in the time domain reservation period is located and a start of the time domain reservation period.

Specifically, configuring the time domain offset includes separately or jointly indicating a slot reservation period and a slot offset through an indication value. The time domain reservation period is indicated through an indication value of 3 bits, the slot offset is indicated through an indication value of 5 bits, and the time domain reservation period and the slot offset are indicated through an indication value of 6 bits.

Configuring the time domain reservation period further includes configuring a slot reservation bitmap, a subframe reservation bitmap, and/or a reservation symbol bitmap in the time domain reservation period. A length of the slot reservation bitmap is 51 bits, a length of the subframe reservation bitmap is S2 bits, and a length of the reservation symbol bitmap is S3 bits. Configuring the slot reservation bitmap and the subframe reservation bitmap in the time domain reservation period further includes at a distance of $$\left\lceil \frac{S1}{2} \right\rceil$$

subframes from a reserved starting position of a slot, setting resource reservation of S2 subframes through a subframe reservation bitmap, where an optional value of S2 may be 3, 5, 6, 8, or 10.

Configuring the subframe reservation bitmap and the reservation symbol bitmap further includes configuring the reservation symbol bitmap in a subframe with a bit corresponding to the subframe reservation bitmap set to 1.

A length of the reservation symbol bitmap in the subframe is 2 bits, 7 bits, 14 bits, 7-$L_{start}$ bits, or 14-$L_{start}$ bits. $L_{start}$ denotes the length of the LTE downlink control region (LTE legacy control channel region).

In a case where configured time domain resource belongs to the first system and target data belongs to the second system, the embodiment of the present application can solve the problem of effective transmission of important data of the first system and the second system in a case where the two systems coexist.

Through the method in this embodiment, the transmission conflict with the SSB and/or the CORESET 0 in the NR can be effectively avoided in the time domain, and the flexibility is high.

Embodiment Five

This embodiment provides a resource indication method that is used for solving the coexistence of the NR system and the LTE-MTC/NB-IoT system and includes configuring reservation symbol information in a time domain reservation period. The time domain reservation period is L subframes; and the reservation symbol information is first S symbols of a reserved time domain reservation period.

Optionally, the time domain reservation period may be configured to be a single subframe or two subframes.

If the time domain reservation period is a single subframe, first S symbols of each subframe are reserved, and S<=$L_{start}$; where $L_{start}$ indicates the length of the LTE downlink control region (LTE legacy control channel region).

If the time domain reservation period is two subframes, first S symbols of even-numbered subframes are reserved, and S<=$L_{start}$; where $L_{start}$ indicates the length of the LTE downlink control region (LTE legacy control channel region).

In a case where configured time-frequency domain resources belong to the first system and target data belongs to the second system, the embodiment of the present application can solve the problem of effective transmission of important data of the first system and the second system in a case where the two systems coexist.

Through the method in this embodiment, the transmission conflict with the NR can be effectively avoided in the time domain, and the overhead is small.

Embodiment Six

This embodiment provides a resource indication method that is used for solving the coexistence of the NR system and the LTE-MTC/NB-IoT system and includes configuring or pre-defining a slot reservation bitmap in a slot reservation period and a reservation symbol bitmap in a reservation symbol period.

The slot reservation period is one of 5 ms, 10 ms, 20 ms, 40 ms, 80 ms, or 160 ms. A time domain slot reserved in a slot is configured, and the time domain slot reserved in the slot indicates a distance between a starting position of a half frame (5 ms half frame) where the slot reservation bitmap in the slot reservation period is located and a start of the slot reservation period.

The reservation symbol period and/or a time domain offset of the reservation symbol are predefined or configured through signaling, and the time domain offset of the reservation symbol indicates a distance between a subframe where the reservation symbol bitmap in the reservation symbol period is located and a start of the reservation symbol period.

In a case where configured time domain resource belongs to the first system and target data belongs to the second system, the embodiment of the present application can solve the problem of effective transmission of important data of the first system and the second system in a case where the two systems coexist.

Through the method in this embodiment, the transmission conflict with the SSB, the CORESET 0 and the like in the NR can be flexibly avoided in the time domain, and the flexibility is high.

Embodiment Seven

This embodiment provides a resource indication method that is used for solving the coexistence of the NR system and the LTE-MTC system and includes configuring reserved frequency domain resource through an indication value.

The reserved frequency domain resource is one or more consecutive resource blocks (RBs), or one or more consecutive NBs, or one or more consecutive RBGs.

The reserved RBs are indicated through X1 bits, where N denotes a number of RBs included in the LTE-MTC system, and M denotes a maximum number of consecutive RBs that needs to be reserved by the LTE-MTC system in the frequency domain for the NR system in the coexistence system at one time.

Optionally, for frequency domain resource reservation for the SSB, M=20; and for frequency domain resource reservation for the CORESET 0, M=24 or 48. For resource reservation for the SSB and the CORESET 0, M>=24.

Figure 6:
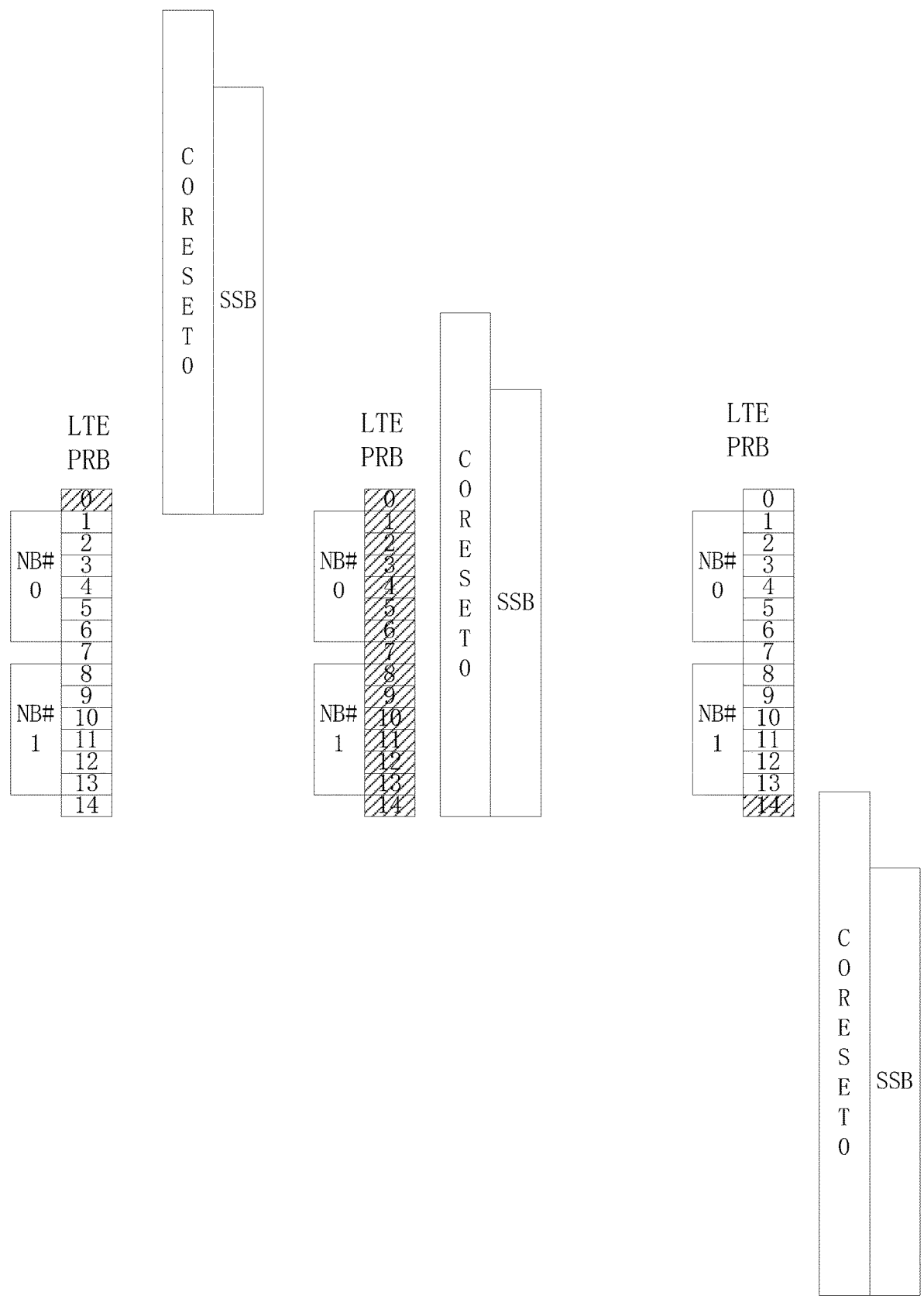
FIG. 6 is a schematic diagram of frequency domain resource reservation according to an embodiment of the present application.

If N<=M, as shown in FIG. 6, at this time, there are (2N−1) possible cases where the RBs in the LTE-MTC system may collide, in the frequency domain, with the SSB/CORESET 0 in the NR, then $X1=\lceil \log_2(2 \cdot N-1) \rceil$, and a frequency resource reservation indication value (FRRIV) indicated through X1 bits indicates a starting position $RB_{START}$ of reserved consecutive RBs and a length $L_{CRRB}$ of the reserved consecutive RBs, thereby indicating the reserved consecutive RBs with characteristics described below. In a case where $RB_{START}=0$, $FFRIV=L_{CRRB}-1$; and in a case where $0<RB_{START}<N$, $FFRIV=N+RB_{START}-1$.

For 0<=FRRIV<N, FRRIV has the same index as a maximum RB index of the reserved consecutive RBs, and the reserved RBs are (FRRIV+1) consecutive RBs from RB 0 to RB FRRIV. $RB_{START}=0$ and $L_{CRRB}=FRRIV+1$.

For N<=FRRIV<2N−1, the reserved consecutive RBs starts from $RB_{START}=(FRRIV-N+1)$, indicating that indexes of the reserved RBs are from (FRRIV−N+1) to (N−1). $L_{CRRB}=2N-FRRIV-1$.

Figure 7:
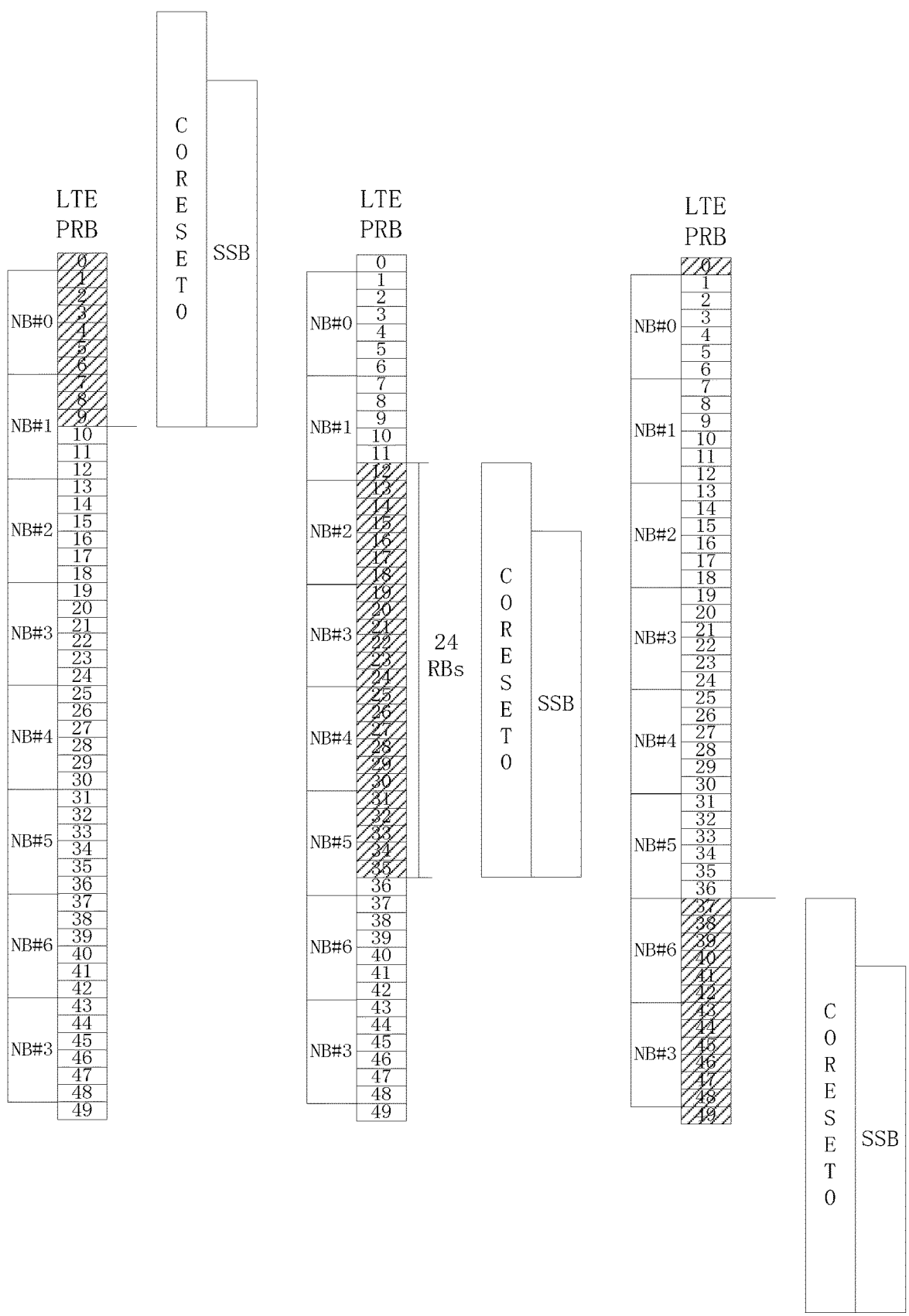
FIG. 7 is a schematic diagram of frequency domain resource reservation according to an embodiment of the present application.

As shown in FIG. 7, from left to right, the following cases are shown: the reserved RBs are on one side of an LTE-MTC bandwidth, the reserved RBs are in the middle of the LTE-MTC bandwidth, and the reserved RBs are on the other side of the LTE-MTC bandwidth. For example, in a case where the reserved RBs are in the middle of the LTE-MTC bandwidth, the starting position is RB 12. If N>M, at this time, there are (N+M−1) possible cases where the RBs in the LTE-MTC system may collide, in the frequency domain, with the SSB/CORESET 0 in the NR, then $X1=\lceil \log_2(N+M-1) \rceil$, and the FRRIV indicated through X1 bits indicates a starting position $RB_{START}$ of reserved consecutive RBs and a length $L_{CRRB}$ of the reserved consecutive RBs, thereby indicating the reserved consecutive RBs with the following characteristics: in a case where $RB_{START}=0$, $FFRIV=L_{CRRB}-1$; in a case where $0<RB_{START}<=N-M$, $FFRIV=RB_{START}+L_{CRRB}-1$, where $L_{CRRB}=M$; and in a case where $RB_{START}>N-M$, $FFRIV=RB_{START}+M-1$.

For 0<=FRRIV<N, FRRIV has the same index as a maximum RB index of the reserved consecutive RBs, and the reserved RBs are (FRRIV+1) consecutive RBs from RB 0 to RB FRRIV. $RB_{START}=0$ and $L_{CRRB}=FRRIV+1$.

For M<=FRRIV<N, FRRIV has the same index as a maximum RB index of the reserved consecutive RBs, indicating that the reserved RBs are M consecutive RBs starting from RB (FRRIV−M+1). $RB_{START}=FRRIV-M+1$ and $L_{CRRB}=M$.

For N<=FRRIV<N+M−1, (FRRIV−M+1) has the same index as a minimum RB index of the reserved consecutive RBs, indicating that indexes of the reserved consecutive RBs are from (FRRIV−M+1) to (N−1). $RB_{START}=(FRRIV-M+1)$ and $L_{CRRB}=N+M-FRRIV-1$.

Further, the reserved NBs are indicated through X2 bits, where P denotes a number of NBs included in system 1 in the coexistence system, and M denotes a maximum number of frequency domain RBs that need to be reserved in frequency domain of system 2 in the coexistence system.

$$\text{If } P <= \lceil \frac{M}{6} \rceil,$$

then $X2=\lceil \log_2(2 \cdot P-1) \rceil$; where FRRIV2 (here briefly described as Y2) indicated through X2 bits indicates a starting position $NB_{START}$ of reserved consecutive NBs and a length $L_{CRNB}$ of the reserved consecutive NBs, indicating the reserved consecutive NBs with characteristics described below.

For 0<=Y2<P, Y2 has the same index as a maximum NB index of the reserved consecutive NBs and indicates that the reserved NBs are (Y2+1) consecutive NBs from NB 0 to NB Y2. $NB_{START}=0$ and $L_{CRNB}=Y2+1$.

For P<=Y2<2P−1, (Y2−P+1) and a minimum NB index of the reserved consecutive NBs indicate that indexes of the reserved NBs are from (Y2−P+1) to (P−1). $NB_{START}=(Y2-P+1)$, and $L_{CRNB}=2P-Y2-1$.

$$\text{If } P > \lceil \frac{M}{6} \rceil, \text{ then } X2 = \lceil \log_2\left(P + \lceil \frac{M}{6} \rceil - 1\right) \rceil;$$

where FRRIV2 (here briefly described as Y2) indicated through X2 bits indicates a starting position $NB_{START}$ of reserved consecutive NBs and a length $L_{CRNB}$ of the reserved consecutive NBs, indicating the reserved consecutive NBs with characteristics described below.

$$\text{For } 0 <= Y2 < \left\lceil \frac{M}{6} \right\rceil,$$

Y2 has the same index as a maximum NB index of reserved consecutive NBs, indicating that the reserved NBs are (Y2+1) consecutive NBs from NB 0 to NB Y2. $NB_{START}=0$ and $L_{CRNB}=Y2+1$.

$$\text{For } \left\lceil \frac{M}{6} \right\rceil <= Y2 < P,$$

Y2 has the same index as a maximum NB index of reserved consecutive NBs, indicating that the reserved NBs are $$\left\lceil \frac{M}{6} \right\rceil$$

NBs starting from NB $$\left( Y2 - \left\lceil \frac{M}{6} \right\rceil + 1 \right).$$

$$NB_{START} = Y2 - \left\lceil \frac{M}{6} \right\rceil + 1 \text{ and } L_{CRNB} = \left\lceil \frac{M}{6} \right\rceil.$$

$$\text{For } P <= Y2 < P + \left\lceil \frac{M}{6} \right\rceil - 1,$$

$$\left( Y2 - \left\lceil \frac{M}{6} \right\rceil + 1 \right)$$

has the same index as a minimum NB index of reserved consecutive NBs, indicating that indexes of the reserved NBs are from $$\left( Y2 - \left\lceil \frac{M}{6} \right\rceil + 1 \right) \text{ to } (P-1).$$

$$NB_{START} = Y2 - \left\lceil \frac{M}{6} \right\rceil + 1 \text{ and } L_{CRNB} = P + \left\lceil \frac{M}{6} \right\rceil - Y2 - 1.$$

Further, the reserved RBGs are indicated through X3 bits, where N denotes a number of RBs included in system 1 in the coexistence system, then a number Q of RBGs included in the system is equal to $$\left\lceil \frac{N}{T} \right\rceil,$$

T denotes a number of RBs included in the RBG, and M denotes a maximum number of frequency domain RBs reserved in frequency domain of system 2 in the coexistence system.

$$\text{If } Q <= \left\lceil \frac{M}{T} \right\rceil,$$

then $X3 = \lceil \log_2 (2 \cdot Q - 1) \rceil$. FRRIV3 (here briefly described as Y3) indicated through X3 bits indicates a starting position $RBG_{START}$ of reserved consecutive RBGs and a length $L_{CRRBG}$ of the reserved consecutive RBGs, denoting the reserved consecutive RBGs with characteristics described below.

For $0<=Y3<Q$, Y3 has the same index as a maximum RBG index of the reserved consecutive RBGs and indicates that the reserved RBGs are (Y3+1) consecutive RBGs from RBG 0 to RBG Y3. $RBG_{START}=0$, and $L_{CRRBG}=Y3+1$.

For $Q<=Y3<2Q-1$, (Y3−Q+1) is the same as a minimum RBG index of the reserved consecutive RBGs, indicating that indexes of the reserved RBGs are from (Y3−Q+1) to (Q−1). $RBG_{START}=Y3-Q+1$, and $L_{CRRBG}=2Q-Y3-1$.

$$\text{If } Q > \left\lceil \frac{M}{T} \right\rceil, \text{ then } X3 = \left\lceil \log_2 \left( Q + \left\lceil \frac{M}{T} \right\rceil - 1 \right) \right\rceil.$$

Y3 indicated through X3 bits denotes the reserved consecutive RBGs with characteristics described below.

$$\text{For } 0 <= Y3 < \left\lceil \frac{M}{T} \right\rceil,$$

Y3 is the same as the maximum RBG index of the reserved consecutive RBGs, indicating that the reserved RBGs are (Y3+1) consecutive RBGs from RBG 0 to RBG Y3. $RBG_{START}=0$, and $L_{CRRBG}=Y3+1$.

$$\text{For } \left\lceil \frac{M}{T} \right\rceil <= Y3 < Q,$$

Y3 is the same as the maximum RBG index of the reserved consecutive RBGs, indicating that the reserved RBGs are $$\left\lceil \frac{M}{T} \right\rceil$$

RBGs starting from RBG $$\left( Y3 - \left\lceil \frac{M}{T} \right\rceil + 1 \right).$$

$$RBG_{START} = Y3 - \left\lceil \frac{M}{T} \right\rceil + 1 \text{ and } L_{CRRBG} = \left\lceil \frac{M}{T} \right\rceil.$$

For $Q <= Y3 < Q + \left\lceil \frac{M}{T} \right\rceil - 1, \left(Y3 - \left\lceil \frac{M}{T} \right\rceil + 1\right)$ is the same as the minimum RBG index of the reserved consecutive RBGs, indicating that indexes of the reserved RBGs are from $\left(Y3 - \left\lceil \frac{M}{T} \right\rceil + 1\right)$ to $(Q-1).RBG_{START} =$ $Y3 - \left\lceil \frac{M}{T} \right\rceil + 1$ and $L_{CRRBG} = Q + \left\lceil \frac{M}{T} \right\rceil - Y3 - 1$.

In a case where configured time-frequency domain resources belong to the first system and target data belongs to the second system, the embodiment of the present application can solve the problem of effective transmission of important data of the first system and the second system in a case where the two systems coexist.

Through the method in this embodiment, resources can be reserved for the coexistence system with minimum overhead in the frequency domain, and the utilization rate of the system can be improved while the coexistence interference is reduced.

Embodiment Eight

This embodiment provides a resource indication method that is used for solving the coexistence of the NR system and the LTE-MTC/NB-IoT system and includes configuring a time domain reservation period and a time domain offset. The time domain reservation period may be indicated by a time domain reservation period indication value, and the time domain offset may be indicated by a time domain offset indication value.

The time domain reservation period is L1 subframes; and the time domain offset indication value indicates a distance between a subframe where a start of a subframe reservation bitmap in the time domain reservation period is located and a start of the time domain reservation period. A reserved subframe allocated to target data is indicated by the subframe reservation bitmap, and a length of the subframe reservation bitmap is M1.

Alternatively, the time domain reservation period is L2 subframes; and the time domain offset indication value indicates a distance between a subframe where a start of a time domain reservation bitmap in the time domain reservation period is located and a start of the time domain reservation period. A reserved slot allocated to target data is indicated by a slot reservation bitmap, and a length of the slot reservation bitmap is M2.

Alternatively, the time domain reservation period is L3 subframes; and the time domain offset indication value indicates a distance between a subframe where a time domain reservation bitmap in the time domain reservation period is located and a start of the time domain reservation period. A reserved symbol allocated to the second system is indicated by a reservation symbol bitmap, and a length of the reservation symbol bitmap is M3, where M3>=1 and M3<14. The time domain offset is predefined or indicated through signaling.

Alternatively, the time domain reservation period is a single subframe, first M4 symbols of each subframe are reserved, where M4<=$L_{start}$ and $L_{start}$ indicates the length of the LTE downlink control region (LTE legacy control channel region). M4 may be predefined or configured through signaling. For the LTE-MTC system, reserved frequency domain resource is configured through an indication value, where the reserved frequency domain resource is one or more consecutive RBs, or one or more consecutive NBs, or one or more consecutive RBGs.

For the NB-IoT system, reserved frequency domain resource is a single RB.

Reserved time-frequency domain resources (time domain+frequency domain two-dimensional resources) are divided into dynamically unchangeable reserved time-frequency domain resources or dynamically changeable reserved time-frequency domain resources.

The dynamically changeable time-frequency domain reservation resources in the system are dynamically activated or deactivated. When being dynamically activated, the time-frequency domain reservation resources can be used by the system.

Signaling for dynamically activating the time-frequency domain reservation resources includes configuration of a timer for activation duration. Before the timer for activation duration expires, the time-frequency domain reservation resources can be used by the system; after the timer for activation duration expires, the time-frequency domain reservation resources cannot be used by the system.

The timer for activation duration for dynamically activating the time-frequency domain resources is predefined.

In a case where configured frequency domain resource belongs to the first system and target data belongs to the second system, the embodiment of the present application can solve the problem of effective transmission of important data of the first system and the second system In a case where the two systems coexist.

Through the method in this embodiment, resources can be reserved for the coexistence system, and the resources reserved for the coexistence system can be flexibly utilized, thereby reducing the coexistence interference and improving the utilization rate of the system.

Embodiment Nine

This embodiment provides a resource indication method that is used for solving the coexistence of the NR system, the LTE-MTC system, and the NB-IoT system and includes configuring a time domain reservation period and a time domain offset.

The time domain reservation period is L1 subframes; and the time domain offset indicates a distance between a subframe where a start of a subframe reservation bitmap in the time domain reservation period is located and a start of the time domain reservation period. The subframe reservation bitmap is configured, and a length of the subframe reservation bitmap is M1.

Alternatively, the time domain reservation period is L2 subframes; and the time domain offset indicates a distance between a subframe where a start of a time domain reservation bitmap in the time domain reservation period is located and a start of the time domain reservation period. The time domain reservation bitmap is a slot reservation bitmap, where a length of the slot reservation bitmap is M2.

Alternatively, the time domain reservation period is L3 subframes; and the time domain offset indicates a distance between a subframe where a time domain reservation bitmap in the time domain reservation period is located and a start of the time domain reservation period. The time domain reservation bitmap is a reservation symbol bitmap, where a length of the reservation symbol bitmap is M3, which satisfies that M3>=1 and M3<14. The time domain offset is predefined or indicated through signaling.

Alternatively, the time domain reservation period is a single subframe, first M4 symbols of each subframe are reserved, where M4<=$L_{start}$ and $L_{start}$ indicates the length of the LTE downlink control region (LTE legacy control channel region). M4 may be predefined or configured through signaling.

Reserved time-frequency domain resources (time domain+frequency domain two-dimensional resources) are divided into dynamically unchangeable reserved time-frequency domain resources or dynamically changeable reserved time-frequency domain resources.

Dynamically changeable time domain reservation resource in the system is dynamically rewritten.

Reserved subframe resource or slot resource can be used by the system before a timer for rewrite expires if some symbols in the subframe or slot are dynamically configured.

A duration of the timer for rewrite may be predefined or configured through signaling.

Further, part or all of time domain reservation within a currently scheduled data transmission duration range is dynamically rewritten.

Whether the time domain reservation within the currently scheduled data transmission duration range can be occupied for data transmission is indicated through 1 bit.

Whether part or all of the time domain reservation within the currently scheduled data transmission duration range can be occupied by the data transmission is indicated through 2 bits.

Specifically, indicating, through the 2 bits, that the time domain reservation within the currently scheduled data transmission duration range is one of the following four cases: the time domain reservation within the currently scheduled data transmission duration range not allowed to be occupied for data transmission, the time domain reservation within a first quarter of the currently scheduled data transmission duration range allowed to be occupied by the data transmission, the time domain reservation within a first half of the currently scheduled data transmission duration range allowed to be occupied by the data transmission, or the time domain reservation within the entire currently scheduled data transmission duration range allowed to be occupied by the data transmission.

Specifically, indicating, through the 2 bits, that the time domain reservation within the currently scheduled data transmission duration range is one of the following four cases: the time domain reservation within the currently scheduled data transmission duration range not allowed to be occupied for data transmission, the time domain reservation within a first quarter of the currently scheduled data transmission duration range not allowed to be occupied by the data transmission, the time domain reservation within a first half of the currently scheduled data transmission duration range not allowed to be occupied by the data transmission, or the time domain reservation within the entire currently scheduled data transmission duration range allowed to be occupied by the data transmission.

Specifically, indicating, through the 2 bits, that the time domain reservation within the currently scheduled data transmission duration range is one of the following four cases: the time domain reservation within the currently scheduled data transmission duration range not allowed to be occupied for data transmission, the time domain reservation within a first half of the currently scheduled data transmission duration range allowed to be occupied by the data transmission, the time domain reservation within the first half of the currently scheduled data transmission duration range not allowed to be occupied by the data transmission, or the time domain reservation within the entire currently scheduled data transmission duration range allowed to be occupied by the data transmission.

Figure 8:
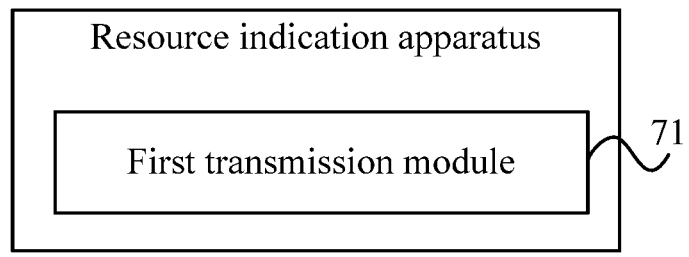
FIG. 8 is a structural diagram of a resource indication apparatus according to an embodiment of the present application.

An embodiment of the present application further provides a resource indication apparatus. As shown in FIG. 8, the apparatus includes a first transmission module 71 configured to transmit first indication signaling to a terminal; where the first indication signaling includes reserved time domain resource information used for indicating that first time domain resource cannot be used for transmission.

In an embodiment, the first indication signaling includes time domain reservation period information and time domain offset information, and time domain resource information reserved in a time domain reservation period. Time domain resource reserved in the time domain reservation period is represented by a time domain reservation bitmap; and a time domain offset corresponding to the time domain offset information is a distance between a subframe where a starting position of the time domain reservation bitmap in the time domain reservation period is located and a start of the time domain reservation period.

In an embodiment, the time domain reservation period information and the time domain offset information are jointly indicated through 6 bits.

In an embodiment, the time domain reservation period information and the time domain offset information are respectively indicated; where the time domain reservation period information is indicated through 3 bits; and the time domain offset information is indicated through 5 bits.

In an embodiment, the time domain reservation bitmap includes a slot reservation bitmap used for indicating a reserved slot in the time domain reservation period.

In an embodiment, in a case where a bit corresponding to the slot reservation bitmap is set to a first value, the slot reservation bitmap is used for indicating that a symbol actually reserved is determined according to a parity of a slot index.

In an embodiment, a length of the slot reservation bitmap is 4 bits or 10 bits

In an embodiment, the time domain reservation bitmap includes a reservation symbol bitmap used for indicating a reserved symbol in the time domain reservation period.

In an embodiment, the time domain reservation bitmap includes a subframe reservation bitmap used for indicating the reserved symbol in the time domain reservation period; where in a case where the bit corresponding to the subframe reservation bitmap is the first value, it is indicated that a preset symbol bit in the corresponding subframe is reserved.

In an embodiment, the time domain reservation bitmap includes a subframe reservation bitmap and a reservation symbol bitmap which are used for indicating a reserved symbol in the time domain reservation period.

In an embodiment, in a case where a bit corresponding to the subframe reservation bitmap is set to a first value, the reservation symbol bitmap is used for indicating a reserved symbol in a corresponding subframe in the time domain reservation period.

In an embodiment, a length of the subframe reservation bitmap is 2 bits, 5 bits, or 10 bits.

In an embodiment, a length of the reservation symbol bitmap is 2 bits, 7 bits, 14 bits, 28 bits, 70 bits, 7-$L_{start}$ bits, or 14-$L_{start}$ bits; and $L_{start}$ denotes a length of a long-term evolution (LTE) downlink control region.

In an embodiment, the first value is 1 or 0.

In an embodiment, the time domain resource information reserved in the time domain reservation period includes slot reservation bitmap information and subframe reservation bitmap information; where a bit corresponding to the subframe reservation bitmap is the first value, then a reserved symbol in a corresponding subframe in the time domain reservation period is predefined; or the time domain resource information reserved in the time domain reservation period includes slot reservation bitmap information, subframe reservation bitmap information, and reservation symbol bitmap information; wherein a reserved symbol in a corresponding subframe in the time domain reservation period is determined according to the reservation symbol bitmap information.

In an embodiment, a reserved subframe starts from X subframes after an end position of the reserved slot, where X is an integer.

In an embodiment, a length of the subframe reservation bitmap is 3 bits, 5 bits, 6 bits, 8 bits, or 10 bits.

In an embodiment, the first indication signaling includes time domain reservation period information used for indicating the time domain reservation period; where first Y symbols in the time domain reservation period are reserved symbols configured for the target data, and the value of Y is indicated by the reservation symbol information in the time domain reservation period, or A value of Y is predefined.

In an embodiment, in a case where the time domain reservation period is one subframe, first fourth value symbols of the subframe are reserved, where the fourth value is less than or equal to $L_{start}$, and $L_{start}$ denotes a maximum length of the LTE downlink control region.

In an embodiment, the first indication signaling includes slot reservation bitmap information and reservation symbol bitmap information; wherein the time domain reservation period of the slot reservation bitmap may be predefined or configured through signaling; the time domain reservation period of the reservation symbol bitmap may be predefined or configured through signaling; the time domain reservation period of the slot reservation bitmap may be the same as or different from the time domain reservation period of the reservation symbol bitmap.

In an embodiment, the first indication signaling further includes reserved frequency domain resource information; where the reserved frequency domain resource information is used for indicating that frequency domain resource corresponding to reserved time domain resource is not allowed to be used for transmission.

In an embodiment, the method further includes transmitting second indication signaling; where the second indication signaling indicates that frequency domain resource corresponding to reserved time domain resource cannot be used for transmission.

In an embodiment, reserved frequency domain resource includes at least one consecutive resource block, or at least one consecutive narrowband, or at least one consecutive RBG.

In an embodiment, in a case where a number of RBs included in a system does not exceed a maximum number of RBs that need to be reserved, when $RB_{START}=0$, $FFRIV=L_{CRRB}-1$; and when $0<RB_{START}<N$, $FFRIV=N+RB_{START}-1$.

For $0<=FRRIV<N$, reserved resource blocks are (FRRIV+1) consecutive RBs from RB 0 to RB FRRIV; where $RB_{START}=0$ and $L_{CRRB}=FRRIV+1$.

For $N<=FRRIV<2N-1$, indexes of the reserved RBs are from (FRRIV−N+1) to (N−1); where $L_{CRRB}=2N-FRRIV-1$.

N denotes the number of existing RBs in the system; FRRIV denotes a frequency domain resource reservation indication value; $RB_{START}$ is used for indicating a starting position of a reserved resource block; and $L_{CRRB}$ is used for indicating a number of the reserved resource blocks.

In an embodiment, in a case where a number of RBs included in a system exceeds a maximum number of RBs that need to be reserved, when $RB_{START}=0$, $FFRIV=L_{CRRB}-1$; and when $RB_{START}>0$, $FFRIV=RB_{START}+M-1$.

For $0<=FRRIV<N$, reserved resource blocks are (FRRIV+1) consecutive RBs from RB 0 to RB FRRIV; where $RB_{START}=0$ and $L_{CRRB}=FRRIV+1$.

For $M<=FRRIV<N$, the reserved RBs are M consecutive RBs starting from RB (FRRIV−M+1); where $RB_{START}=FRRIV-M+1$, and $L_{CRRB}=M$.

For $N<=FRRIV<N+M-1$, the reserved RBs are consecutive RBs from RB (FRRIV−M+1) to RB (N−1); where $RB_{START}=(FRRIV-M+1)$, and $L_{CRRB}=N+M-FRRIV-1$.

N denotes the number of the resource blocks included in the system; M denotes the maximum value of the number of the resource blocks that need to be reserved; FRRIV denotes a frequency domain reservation indication value; $RB_{START}$ is used for indicating a starting position of a reserved resource block; and $L_{CRRB}$ is used for indicating a number of the reserved resource blocks.

In an embodiment, the time domain reservation period is one of 5 ms, 10 ms, 20 ms, 40 ms, 80 ms, and 160 ms.

In an embodiment, the time domain resource is used for transmitting, in a first system, target data of a second system; and the first system and the second system share a same spectrum resource.

In an embodiment, the first system is an LTE system, an MTC system, or an NB-IoT system.

An embodiment of the present application further provides a resource indication apparatus. The apparatus includes a second transmission module configured to transmit second indication signaling to a terminal; where the second indication signaling is used for indicating that frequency domain resource corresponding to reserved time domain resource cannot be used for transmission.

The resource indication apparatus provided in an embodiment of the present application is configured to perform the resource indication method provided in any one of the embodiments of the present application.

Figure 9:
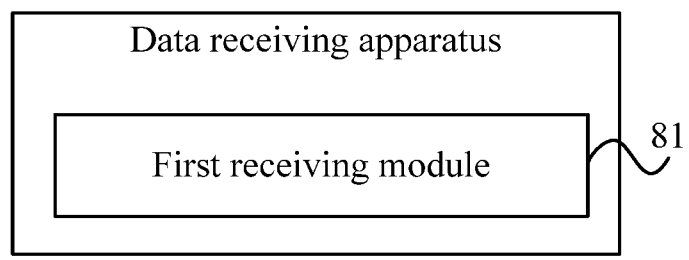
FIG. 9 is a structural diagram of a data receiving apparatus according to an embodiment of the present application.

An embodiment of the present application further provides a data receiving apparatus. As shown in FIG. 9, the apparatus includes a first receiving module 81 configured to receive first indication signaling transmitted by a base station; where the first indication signaling is used for indicating that first time domain resource cannot be used for transmission.

In an embodiment, the first indication signaling further includes reserved frequency domain resource information; where the reserved frequency domain resource information is used for indicating that frequency domain resource corresponding to reserved time domain resource is not allowed to be used for transmission.

An embodiment of the present application further provides a data receiving apparatus. The apparatus includes a second receiving module configured to receive second indication signaling transmitted by a base station; where the second indication signaling is used for indicating that frequency domain resource corresponding to reserved time domain resource cannot be used for transmission.

The data receiving apparatus provided in an embodiment of the present application is configured to receive data transmitted by resource indicated by the resource indication apparatus provided in any one of the embodiments of the present application.

In this embodiment of the present application, for the function of each module in each apparatus, reference may be made to the corresponding description in the method embodiment described above, and repetition is not made here.

Figure 10:
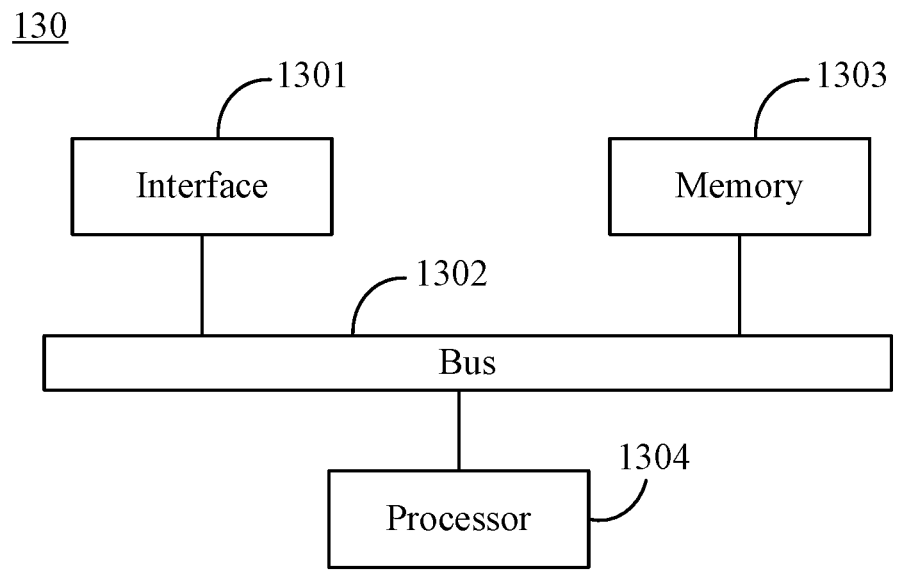
FIG. 10 is a structural diagram of a terminal according to an embodiment of the present application.

FIG. 10 is a structural diagram of a terminal according to an embodiment of the present application. As shown in FIG. 10, the terminal 130 provided in the embodiment of the present application includes a memory 1303 and a processor 1304. The terminal 130 may further include an interface 1301 and a bus 1302. The interface 1301, the memory 1303, and the processor 1304 are connected through the bus 1302. The memory 1303 is configured to store instructions. The processor 1304 is configured to read the instructions to execute the solutions of the preceding embodiments applied to the terminal. The implementation principles and technical effects are similar and are not repeated here.

Figure 11:
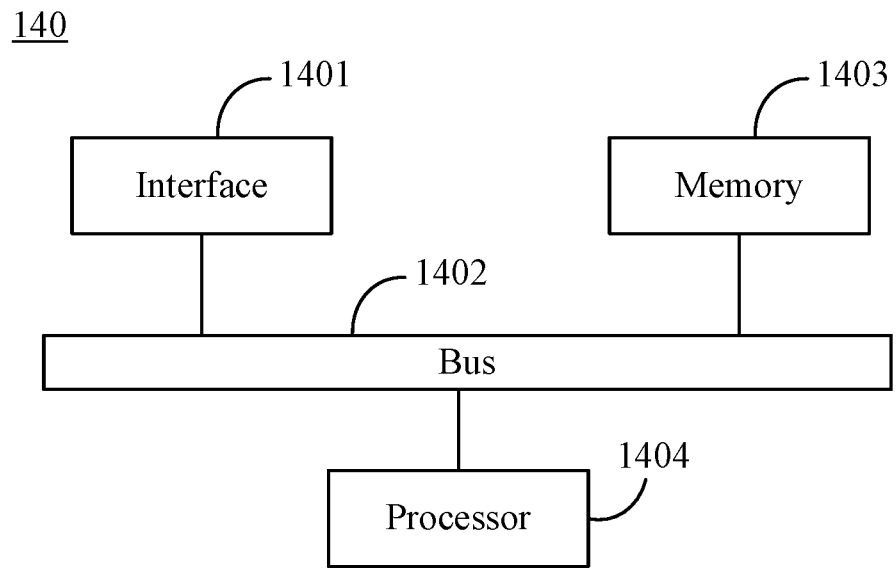
FIG. 11 is a structural diagram of a base station according to an embodiment of the present application.

FIG. 11 is a structural diagram of a base station according to an embodiment of the present application. As shown in FIG. 11, the base station 140 provided in the embodiment of the present application includes a memory 1403 and a processor 1404. The base station may further include an interface 1401 and a bus 1402. The interface 1401, the memory 1403, and the processor 1404 are connected through the bus 1402. The memory 1403 is configured to store instructions. The processor 1404 is configured to read the instructions to execute the technical solutions of the preceding embodiments applied to the next-generation NodeB. The implementation principles and technical effects are similar and are not repeated here.

Figure 12:
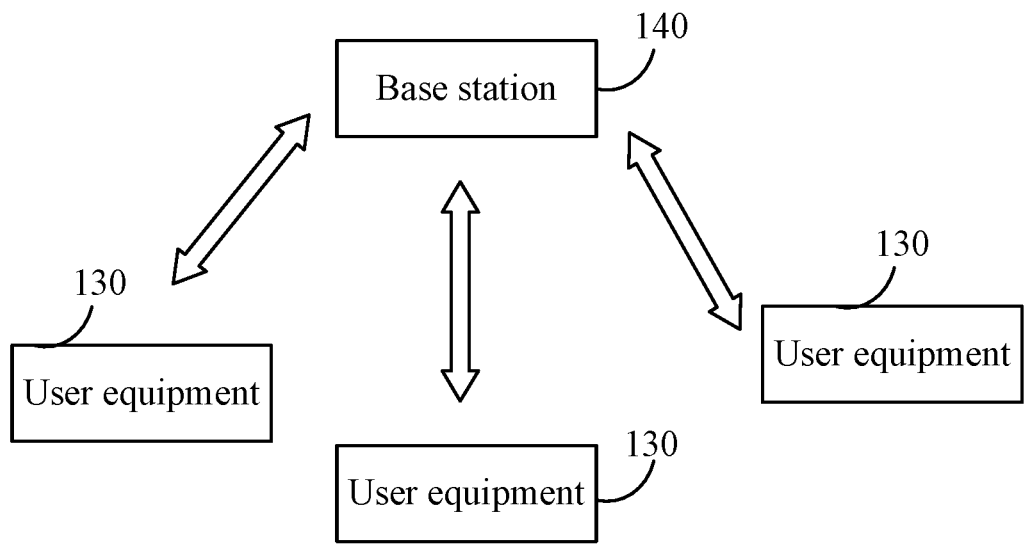
FIG. 12 is a structural diagram of a communication system according to an embodiment of the present application.

FIG. 12 is a structural diagram of a communication system according to an embodiment of the present application. As shown in FIG. 12, the system includes the terminal 130 of the preceding embodiments and the base station 140 of the preceding embodiments. The communication system of the embodiment of the present application includes, but is not to, a Long-Term Evolution (LTE) system, a LTE Frequency Division Duplex (FDD) system, a LTE Time Division Duplex (TDD) system, a Universal Mobile Telecommunication System (UMTS), or a 5th Generation (5G) system, etc.

The above are only exemplary embodiments of the present application and are not intended to limit the scope of the present application.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, although the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, micro-codes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable for a local technical environment and may be implemented using any suitable data storage technology. The memory in embodiments of the present application may be a volatile memory or a non-volatile memory or may include both a volatile memory and a non-volatile memory. The non-volatile memory may be a read-only memory (ROM), a programmable ROM (PROM), an erasable PROM (EPROM), an electrically EPROM (EEPROM), a flash memory, or the like. The volatile memory may be a random-access memory (RAM), which serves as an external cache. Many forms of RAMs may be used, such as a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct rambus random-access memory (DRRAM). The memory of the system and the method described in the present application includes, but is not limited to, these and any other suitable type of memory.

The processor of embodiments of the present application may be of any type suitable for the local technical environment such as, but not limited to, a general-purpose computer, a special-purpose computer, a microprocessor, a digital signal processor (DSP), an application specific integrated circuit (ASIC), a field-programmable gate array (FPGA) or any other programmable logic device, a discrete gate or transistor logic device, a discrete hardware component, or a processor based on a multi-core processor architecture. The general-purpose processor may be, for example, a microprocessor or any commonly used processor. The preceding processor may implement or execute steps of the methods in embodiments of the present application. Software modules may be located in a random-access memory, a flash memory, a read-only memory, a programmable read-only memory, an electrically erasable programmable read-only memory, a register, or any other established storage medium in the art. The storage medium is located in the memory. The processor may read information in the memory and implement the steps of the preceding methods in combination with hardware.

What is claimed is:

1. A resource indication method, comprising:
    transmitting first indication signaling to a terminal;
    wherein the first indication signaling comprises:
        time domain reservation period information, time domain offset information, and time domain resource information reserved in a time domain reservation period corresponding to the time domain reservation period information, the time domain resource information used to indicate that a corresponding time domain resource is not allowed to be used for transmission,
        wherein a time domain resource reserved in the time domain reservation period is represented by a time domain reservation bitmap,
        wherein the time domain reservation bitmap comprises:
            a slot reservation bitmap used to indicate a reserved slot in the time domain reservation period; and a reservation symbol bitmap used to indicate a reserved symbol in the time domain reservation period, wherein the time domain reservation period information and the time domain offset information are jointly coded or independently coded, and wherein a time domain offset corresponding to the time domain offset information is a distance between a subframe where a starting position of the time domain reservation bitmap in the time domain reservation period is located and a start of the time domain reservation period.

2. The method of claim 1, wherein the time domain reservation period is at least one of 5 ms, 10 ms, 20 ms, 40 ms, 80 ms, or 160 ms.

3. The method of claim 1, wherein the first indication signaling further comprises a reserved frequency domain resource information; and wherein the reserved frequency domain resource information is used to indicate that a frequency domain resource corresponding to the time domain resource is not allowed to be used for transmission.

4. The method of claim 1, wherein the time domain reservation bitmap further comprises a subframe reservation bitmap used to indicate a reserved subframe in the time domain reservation period.

5. The method of claim 1, wherein the time domain resource information is reserved in a first system for a second system, wherein the first system comprises an MTC system or an NB-IOT system, and wherein the second system comprises an NR system.

6. An apparatus comprising:

a memory storing a plurality of instructions; and a processor configured to execute the plurality of instructions, and upon execution of the plurality of instructions, is configured to:

receive first indication signaling from a base station;

wherein the first indication signaling comprises:

time domain reservation period information, time domain offset information, and time domain resource information reserved in a time domain reservation period corresponding to the time domain reservation period information, the time domain resource information used to indicate that a corresponding time domain resource is not allowed to be used for transmission, wherein a time domain resource reserved in the time domain reservation period is represented by a time domain reservation bitmap, wherein the time domain reservation bitmap comprises:

a slot reservation bitmap used to indicate a reserved slot in the time domain reservation period; and a reservation symbol bitmap used to indicate a reserved symbol in the time domain reservation period, wherein the time domain reservation period information and the time domain offset information are jointly coded or independently coded, and wherein a time domain offset corresponding to the time domain offset information is a distance between a subframe where a starting position of the time domain reservation bitmap in the time domain reservation period is located and a start of the time domain reservation period.

7. The method of claim 6, wherein the time domain reservation period is at least one of 5 ms, 10 ms, 20 ms, 40 ms, 80 ms, or 160 ms.

8. The method of claim 6, wherein the first indication signaling further comprises reserved frequency domain resource information; and wherein the reserved frequency domain resource information is used for indicating that frequency domain resource corresponding to reserved time domain resource is not allowed to be used for transmission.

9. The method of claim 6, wherein the time domain reservation bitmap further comprises a subframe reservation bitmap used to indicate a reserved subframe in the time domain reservation period.

10. The method of claim 6, wherein the time domain resource information is reserved in a first system for a second system, wherein the first system comprises an MTC system or an NB-IOT system, and wherein the second system comprises an NR system.

11. An apparatus comprising:

a memory storing a plurality of instructions; and a processor configured to execute the plurality of instructions, and upon execution of the plurality of instructions, is configured to:

transmit first indication signaling to a terminal;

wherein the first indication signaling comprises:

time domain reservation period information, time domain offset information, and time domain resource information reserved in a time domain reservation period corresponding to the time domain reservation period information, the time domain resource information used to indicate that a corresponding time domain resource is not allowed to be used for transmission, wherein a time domain resource reserved in the time domain reservation period is represented by a time domain reservation bitmap, wherein the time domain reservation bitmap comprises:

a slot reservation bitmap used to indicate a reserved slot in the time domain reservation period; and a reservation symbol bitmap used to indicate a reserved symbol in the time domain reservation period, wherein the time domain reservation period information and the time domain offset information are jointly coded or independently coded, and wherein a time domain offset corresponding to the time domain offset information is a distance between a subframe where a starting position of the time domain reservation bitmap in the time domain reservation period is located and a start of the time domain reservation period.

12. The apparatus of claim 11, wherein the time domain reservation period is at least one of 5 ms, 10 ms, 20 ms, 40 ms, 80 ms, or 160 ms.

13. The apparatus of claim 11, wherein the first indication signaling further comprises reserved frequency domain resource information; and wherein the reserved frequency domain resource information is used for indicating that frequency domain resource corresponding to reserved time domain resource is not allowed to be used for transmission.

14. The apparatus of claim 11, wherein the time domain reservation bitmap further comprises a subframe reservation bitmap used to indicate a reserved subframe in the time domain reservation period.

15. The apparatus of claim 11, wherein the time domain resource information is reserved in a first system for a second system, wherein the first system comprises an MTC system or an NB-IOT system, and wherein the second system comprises an NR system.

\* \* \* \* \*